(12) United States Patent
Abe et al.

(10) Patent No.: US 12,013,908 B2
(45) Date of Patent: Jun. 18, 2024

(54) EVALUATION UPDATING DEVICE, METHOD, AND PROGRAM

(71) Applicant: NIPPON TELEGRAPH AND TELEPHONE CORPORATION, Tokyo (JP)

(72) Inventors: Naoto Abe, Tokyo (JP); Hiroshi Konishi, Tokyo (JP); Hitoshi Seshimo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 184 days.

(21) Appl. No.: 17/271,565

(22) PCT Filed: Aug. 15, 2019

(86) PCT No.: PCT/JP2019/032041
§ 371 (c)(1),
(2) Date: Feb. 25, 2021

(87) PCT Pub. No.: WO2020/045107
PCT Pub. Date: Mar. 5, 2020

(65) Prior Publication Data
US 2021/0182353 A1 Jun. 17, 2021

(30) Foreign Application Priority Data
Aug. 27, 2018 (JP) .................................. 2018-158676

(51) Int. Cl.
*G06F 16/9536* (2019.01)
*G06F 16/9537* (2019.01)
(Continued)

(52) U.S. Cl.
CPC ...... *G06F 16/9536* (2019.01); *G06F 16/9537* (2019.01); *G06Q 30/0282* (2013.01); *G06Q 50/12* (2013.01); *G07C 13/00* (2013.01)

(58) Field of Classification Search
None
See application file for complete search history.

(56) References Cited

U.S. PATENT DOCUMENTS 6,665,655 B1 * 12/2003 Warner .................. G06F 16/30
707/999.005
7,519,562 B1 *  4/2009 Vander Mey .......... G06Q 99/00
705/500

(Continued)

FOREIGN PATENT DOCUMENTS

JP    2015172856 A    10/2015
JP     201727579 A     2/2017
JP     201849504 A     3/2018

OTHER PUBLICATIONS

Mio Sato (2011) "About the reliability of information sent from social media," Junior College of Aizu,Department of Industrial Information, Management Information Course, 2011Graduation Research Papers Abstracts, 4 pages.

(Continued)

*Primary Examiner* — Giuseppi Giuliani

(57) ABSTRACT

To appropriately update evaluation on an evaluation target based on posts related to an evaluation target from a user. When a reliability of an evaluation information drops equal to or below a threshold related to the reliability of the evaluation information, the evaluation information representing an evaluation on an evaluation target, the reliability representing an index provided to evaluation information when the evaluation information is generated, an evaluation unit 26 of an evaluation device 14 generates evaluation information on the evaluation target again based on post (Continued)

information different from post information used for generating the evaluation information on the evaluation target.

20 Claims, 22 Drawing Sheets

(51) Int. Cl.
    *G06Q 30/0282*     (2023.01)
    *G06Q 50/12*     (2012.01)
    *G07C 13/00*     (2006.01)

(56) References Cited

U.S. PATENT DOCUMENTS

| | | | |
|---|---|---|---|
| 8,843,481 B1 * | 9/2014 | Xu | G06F 16/9535 707/732 |
| 2013/0007238 A1 * | 1/2013 | Sandholm | G06F 16/9537 709/223 |

OTHER PUBLICATIONS

Ootsuka et al. (2012) "Evaluation and Development reputation network for SNS user evaluation using realistic distance," The 11th Knowledge Distribution Network Study Group of the Japanese Society for Artificial Intelligence, 6 pages.

Ishigaki et al. (2016) "Proposal of user importance evaluation method using Twitter-specific network structure," DEIM Forum 2016, 8 pages.

* cited by examiner

| POSTER INFORMATION | POSITION INFORMATION | POST INFORMATION ||||| STORAGE DATE | NOT CHECKED YET |
| --- | --- | --- | --- | --- | --- | --- | --- | --- |
| | | ITEM 1 (REQUIRED) | ITEM 2 (OPTIONAL) | INPUT ITEM 3: (OPTIONAL) | ... | VOTING INFORMATION | | |
| USER A | 10001 | STEPS | 2.0 | - | ... | - | 6/1 | - |
| USER B | (35.69,139.77) | RESTROOM | MULTIPURPOSE | - | ... | - | 5/7 | - |
| USER C | 201804A001 | COMMERCIAL FACILITY | - | - | ... | ○ | 4/12 | 4/13 |
| USER D | 201804B129 | STEPS | 8.0 | INCLINED | ... | × | 5/24 | - |
| ... | ... | ... | ... | ... | ... | ... | ... | ... |

*- IN TABLE INDICATES NO VALUE

Fig. 3

<EXAMPLE OF CLUSTERING RULE>

| No | USED ITEM | VALUE | THRESHOLD | FIRST CATEGORY | SECOND CATEGORY | ... | N-TH CATEGORY |
|---|---|---|---|---|---|---|---|
| 1 | POSITION INFORMATION | CHARACTER STRING | 1.0 | - | - | ... | - |
| 2 | POSITION INFORMATION | CONTINUOUS VALUE | 10.0 | - | - | ... | - |
| 3 | POST INFORMATION | CHARACTER STRING | 12.0 | ITEM 1 | ITEM 2 | ... | - |

Fig. 5

EXAMPLE) CLUSTERING OF POST INFORMATION
CASE OF DESIGNATING ITEM 1 TO FIRST CATEGORY, ITEM 2 TO SECOND CATEGORY, AND ITEM 3 TO THIRD CATEGORY (EXAMPLE WITH NO. 3)

| POSTER | ITEM 1 | ITEM 2 | INPUT ITEM 3: |
|---|---|---|---|
| USER A | STEPS | 2 cm | MILD SLOPE |
| USER B | STEPS | 2 cm | INCLINED |
| USER C | STEPS | 8 cm | INCLINED |
| USER D | STAIRS | LESS THAN 10 STEPS | |

⇩ QUANTIFY

HIGHER CATEGORY IS PROVIDED WITH WEIGHT THAT MAXIMUM DISTANCE OF SUB-CATEGORY + 1

| POSTER | FIRST CATEGORY | | SECOND CATEGORY | | | THIRD CATEGORY | |
|---|---|---|---|---|---|---|---|
| | STEPS | STAIRS | 2 cm | 8 cm | LESS THAN 10 STEPS | INCLINED | MILD SLOPE |
| USER A | 12 | 0 | 3 | 0 | 0 | 0 | 1 |
| USER B | 12 | 0 | 3 | 0 | 0 | 1 | 0 |
| USER C | 12 | 0 | 0 | 3 | 0 | 1 | 0 |
| USER D | 0 | 12 | 0 | 0 | 3 | 0 | 0 |

MANHATTAN DISTANCE = 2 } DETERMINE THAT A AND B ARE CLOSE
MANHATTAN DISTANCE = 6

⇩ CLUSTERING (THRESHOLD = 3)

FOR EXAMPLE, CATEGORIZED INTO FIRST CATEGORY WITH THRESHOLD SMALLER THAN 12 AND INTO SECOND CATEGORY WITH THRESHOLD SMALLER THAN 3

| POSTER | FIRST CATEGORY | | SECOND CATEGORY | | | THIRD CATEGORY | |
|---|---|---|---|---|---|---|---|
| | STEPS | STAIRS | 2 cm | 8 cm | LESS THAN 10 STEPS | INCLINED | MILD SLOPE |
| USER A | 12 | 0 | 3 | 0 | 0 | 0 | 1 |
| USER B | 12 | 0 | 3 | 0 | 0 | 1 | 0 |
| USER C | 12 | 0 | 0 | 3 | 0 | 1 | 0 |
| USER D | 0 | 12 | 0 | 0 | 3 | 0 | 0 |

<EXAMPLE OF DENDROGRAM FOR DATA ON THE LEFT>

THRESHOLD = 12
THRESHOLD = 3

| USER | NUMBER OF POSTS | ADOPTION COUNT | CONTRIBUTION RATE | ADOPTION RATE | USER RELIABILITY |
|---|---|---|---|---|---|
| USER A | 2 | 1 | 0.9241 | 0.5 | 0.6489 |
| USER B | 5 | 4 | 0.9999 | 0.8 | 0.8889 |
| USER C | 1 | 0 | 0.5 | 0 | 0 |
| USER D | 10 | 2 | 0.9999 | 0.2 | 0.3333 |

*AVERAGE NUMBER OF POSTS OF ENTIRE USER $\mu = 1.0$, VARIANCE $\sigma = 0.8$, $\alpha = 2.0$

Fig. 10

| POSTER | FIRST CATEGORY | | SECOND CATEGORY | | | THIRD CATEGORY | |
|---|---|---|---|---|---|---|---|
| | STEPS | STAIRS | 2 cm | 8 cm | LESS THAN 10 STEPS | INCLINED | MILD SLOPE |
| USER A | 12 | 0 | 3 | 0 | 0 | 0 | 1 |
| USER B | 12 | 0 | 3 | 0 | 0 | 1 | 0 |
| USER C | 12 | 0 | 0 | 3 | 0 | 1 | 0 |
| USER D | 0 | 12 | 0 | 0 | 3 | 0 | 0 |

| POSTER | FIRST CATEGORY | | SECOND CATEGORY | | | THIRD CATEGORY | |
|---|---|---|---|---|---|---|---|
| | STEPS | STAIRS | 2 cm | 8 cm | LESS THAN 10 STEPS | INCLINED | MILD SLOPE |
| USER A | 12 | 0 | 3 | 0 | 0 | 0 | 1 |
| USER B | 12 | 0 | 3 | 0 | 0 | 1 | 0 |
| USER C | 12 | 0 | 0 | 3 | 0 | 1 | 0 |
| USER D | 0 | 12 | 0 | 0 | 3 | 0 | 0 |
| USER D | 0 | 12 | 0 | 0 | 3 | 0 | 0 |
| USER D | 0 | 12 | 0 | 0 | 3 | 0 | 0 |
| USER D | 0 | 12 | 0 | 0 | 3 | 0 | 0 |
| USER D | 0 | 12 | 0 | 0 | 3 | 0 | 0 |
| USER D | 0 | 12 | 0 | 0 | 3 | 0 | 0 |

Fig. 12

| ID | POSITION INFORMATION | EXTRACTED INFORMATION | | | | STORAGE DATE |
|---|---|---|---|---|---|---|
| | | ITEM 1 | ITEM 2 | INPUT ITEM 3 | | |
| 00001 | 10001 | STEPS | 2.0 | — | ... | 6/1 |
| 22300 | (35.69, 139.77) | RESTROOM | MULTIPURPOSE | — | ... | 5/7 |
| 10321 | (35.72, 139.78) | COMMERCIAL FACILITY | — | WITH RESTROOM | ... | 4/12 |
| 00980 | 201804B124 | STEPS | 8.0 | INCLINED | ... | 5/24 |
| ⋮ | ⋮ | ⋮ | ⋮ | ⋮ | ⋮ | ⋮ |

| POSTER INFORMATION | ID | VOTING INFORMATION | STORAGE DATE | NOT CHECKED YET |
|---|---|---|---|---|
| USER A | 10001 | ○ | 3/13 | — |
| USER B | 10101 | × | 4/28 | 5/3 |
| USER C | 20500 | ○ | 4/3 | 4/13 |
| ⋮ | ⋮ | | | |

*ID IS COMMON ITEM

Fig. 16

<POST DATA>

| POSTER INFORMATION | POSITION INFORMATION | POST INFORMATION ||| VOTING INFORMATION | STORAGE DATE | NOT CHECKED YET |
|---|---|---|---|---|---|---|---|
| | | ITEM 1 | ITEM 2 | INPUT ITEM 3 | | | |
| USER A | 10001 | STEPS | 2 cm | MILD SLOPE | – | 5/23 | – |
| USER B | 10001 | STEPS | 2 cm | INCLINED | – | 4/18 | – |
| USER C | 10001 | STEPS | 8 cm | INCLINED | – | 6/3 | – |
| USER D | 10001 | STAIRS | LESS THAN 10 STEPS | | – | 5/6 | – |
| USER E | 10350 | STAIRS | 10 STEPS OR MORE | | – | 3/29 | – |

<EVALUATION INFORMATION>

| ID | POSITION INFORMATION | EXTRACTED INFORMATION ||| STORAGE DATE |
|---|---|---|---|---|---|
| | | ITEM 1 | ITEM 2 | INPUT ITEM 3 | |
| 00980 | B124 | STEPS | 8 cm | INCLINED | 5/13 |

| POSTER INFORMATION | ID | POSITION INFORMATION | STORAGE DATE | NOT CHECKED YET |
|---|---|---|---|---|
| USER A | 00980 | ○ | 5/13 | – |
| USER B | 00980 | × | 6/3 | – |
| USER C | 00980 | ○ | 4/25 | – |
| USER D | 00980 | × | 3/8 | – |

Fig. 17

| POSTER INFORMATION | FIRST CATEGORY | | SECOND CATEGORY | | | THIRD CATEGORY | |
|---|---|---|---|---|---|---|---|
| | STEPS | STAIRS | 2 cm | 8 cm | LESS THAN 10 STEPS | INCLINED | MILD SLOPE |
| USER A | 12 | 0 | 3 | 0 | 0 | 0 | 1 |
| USER B | 12 | 0 | 3 | 0 | 0 | 1 | 0 |
| USER C | 12 | 0 | 0 | 3 | 0 | 1 | 0 |
| USER D | 0 | 12 | 0 | 0 | 3 | 0 | 0 |

| POSTER INFORMATION | FIRST CATEGORY | | SECOND CATEGORY | | | THIRD CATEGORY | |
|---|---|---|---|---|---|---|---|
| | STEPS | STAIRS | 2 cm | 8 cm | LESS THAN 10 STEPS | INCLINED | MILD SLOPE |
| USER A | 12 | 0 | 3 | 0 | 0 | 0 | 1 |
| USER B | 12 | 0 | 3 | 0 | 0 | 1 | 0 |
| USER C | 12 | 0 | 0 | 3 | 0 | 1 | 0 |
| USER D | 0 | 12 | 0 | 0 | 3 | 0 | 0 |
| USER D | 0 | 12 | 0 | 0 | 3 | 0 | 0 |
| USER D | 0 | 12 | 0 | 0 | 3 | 0 | 0 |
| USER D | 0 | 12 | 0 | 0 | 3 | 0 | 0 |
| USER D | 0 | 12 | 0 | 0 | 3 | 0 | 0 |
| USER D | 0 | 12 | 0 | 0 | 3 | 0 | 0 |

Fig. 18

| AREA | $N(A_i)$ | $M(A_i)$ | $e_{num}(A_i)$ | $e_{avg}(A_i)$ | $H(A_i)$ |
|---|---|---|---|---|---|
| $A_1$ | 1 | 1 | 1 | 0.9 | 0.9 |
| $A_2$ | 0 | 10 | 0 | 0 | 0 |
| $A_3$ | 2 | 3 | 0.66667··· | 0.6 | 0.4 |
| $A_4$ | 4 | 5 | 0.8 | 0.1 | 0.08 |

CONTENT OF PROMPT FOR POSTING CAN BE CHANGE DEPENDING ON ITEM CLOSE TO 0

Fig. 23

EVALUATION UPDATING DEVICE, METHOD, AND PROGRAM

CROSS-REFERENCE TO RELATED APPLICATIONS

This application is a U.S. 371 Application of International Patent Application No. PCT/JP2019/032041, filed on 15 Aug. 2019, which application claims priority to and the benefit of JP Application No. 2018-158676, filed on 27 Aug. 2018, the disclosures of which are hereby incorporated herein by reference in their entireties.

TECHNICAL FIELD

The present invention relates to an evaluation update device, method, and program.

BACKGROUND ART

When research or measurement is performed on a target, a result thereof may be set as evaluation information on the target. Examples of the evaluation information include store information on a store as the evaluation target, review information on a food served as the evaluation target, and a facility information related to a facility as the evaluation target.

Recently, various pieces of information have been posted or voted on the Internet through Social Networking Services (SNS) and the like. Thus, people can access evaluation information on various targets on the Internet. Thus, the posting or voting using SNS enables people to easily refer to the evaluation information indicating the road congestion situation over a wide area, reputation of restaurants, reputation of food served, and the like for example.

Users post content on SNS. For a user who has posted content, other users make a personal evaluation. People may assume that content posted by a user with high reliability includes appropriate evaluation information. In this context, there is an approach of estimating the reliability of a user based on the personal evaluation of the user.

For example, one known technique proposes evaluation of a Twitter (registered trademark) user (see, for example, Non Patent Literature 1). According to this technique, the reliability of a user sending information is evaluated using the number of tweets, as well as the number of accounts he or she is following, the number of followers, and the number of tweets with URL.

Furthermore, according to another known technique (see, for example, Non Patent Literature 2), a user is evaluated based on a distance between users based on Hypertext Induced Topic Selection (Hits) (registered trademark), PageRank, and the like, while taking the position information on the network as well as a parameter unique to the SNS such as the number of friends.

Still another known technique focuses on the retweet function of Twitter (registered trademark) (see, for example, Non Patent Literature 3). Specifically, the importance of a user is estimated based on a network focusing on the number of retweets and response speed. This technique relates to research to find hub-authority.

CITATION LIST

Non Patent Literature

Non Patent Literature 1: Mio Sato, Reliability of Information from Social Media, [online], abstracts of graduation theses in 2011, Management Commerce Accounting Economics Informatics, Junior College Division, the University of Aizu, [searched on Aug. 13, 2018], Internet <URL: http://www.jc.u-aizu.ac.jp/department/management/youshi/2011/09.pdf>

Non Patent Literature 2: Takanobu Otsuka, two others, "Evaluation and Development reputation network for SNS user evaluation using realistic distance", 11th Meeting of Intelligence Distribution Network Research Group, the Japanese Society for Artificial Intelligence, Internet <URL: http://sigksn.html.xdomain.jp/conf11/SIG-KSN-011-06.pdf>

Non Patent Literature 3: Aimu Ishigaki, Masayuki Numao, "Suggestion about User Importance Evaluation Method Using Twitter-Specific Network Structure", DEIM Forum 2016 B7-4, Internet <URL: http://db-event.jpn.org/deim2016/papers/302.pdf>

SUMMARY OF THE INVENTION

Technical Problem

As is apparent from Non Patent Literatures 1 to 3 above, techniques of evaluating information originating from social media have been available. According to such related arts, the user who is the origin of the information is evaluation using the number of tweets and the number of accounts he or she is following.

The evaluation information (such as the status of each location, the road congestion situation over a wide area, reputation of restaurants, reputation of food served, and the like for example) on the evaluation target may change over time.

For example, in the related arts, information provided from a user with high reliability is evaluated as having high reliability. Still, the evaluation information on the evaluation target indicated by the information thus provided changes over time. Thus, the evaluation information indicated by the information provided in the past by the user may not reflect the current status.

In view of the above, a technique of appropriately updating evaluation information that had become inappropriate over time has been demanded. Currently, anyone can post content at any time they want using smartphones and the like and a very large amount of posted content from the past to the present is accumulating. All things considered, a post indicating current evaluation information on an evaluation target needs to be extracted from a huge amount of posts stacked up, and the current evaluation needs to be updated.

The present invention is made in view of the above, and an object of the present invention is to provide an evaluating device, method, and program with which evaluation information on an evaluation target can be appropriately updated in accordance with a post of the user related to the evaluation target.

Means for Solving the Problem

To achieve the object described above, an evaluation device according to a first aspect of the present invention includes a selection unit configured to select, from a group of pieces of post data including a plurality of pieces of post data each including post information indicating a post content related to an evaluation target and poster information indicating a user who has posted the post information, based on a user index that indicates the user and becomes greater for the user, indicated by the poster information, with a larger number of pieces of the post information of the user posted in past and with a larger number of pieces of the post information adopted as information having a predetermined reliability or higher, the post data with the user index being equal to or greater than a threshold; and an evaluation unit configured to evaluate whether the evaluation target exists, based on the post data selected by the selection unit.

Furthermore, the evaluation unit may evaluate a likelihood of a property of the evaluation target based on the post data selected by the selection unit.

Furthermore, the pieces of post data each may further include position information on the evaluation target, the evaluation device may further include a clustering unit configured to cluster a plurality of pieces of the post data into a plurality of clusters based on at least one of the position information and the post information of the post data in the group of pieces of post data, and the selection unit may calculate, for each of the clusters, as a result of the clustering by the clustering unit, an average of the user indices of a plurality of pieces of the post data belonging to the cluster, and select the post data belonging to the cluster with the average of the user indices of the cluster being equal to or greater than a threshold for the user index.

Furthermore, the clustering unit may cluster a plurality of pieces of the post data based on similarity between each of the plurality of pieces of post data, by using hierarchical clustering with which at least one of the clusters includes a plurality of clusters.

Furthermore, the evaluation unit may calculate, based on the post information of the post data selected by the selection unit, content index representing an index related to the post information, as a likelihood of a property of the evaluation target, and adopt as evaluation information that is the information having the predetermined reliability or higher, the post data with the post information having the content index being equal to or greater than a threshold for the content index, from the pieces of post data selected by the selection unit.

Furthermore, the evaluation unit may calculate the content index based on a probability obtained for each combination between information on an event related to the evaluation target and information related to the evaluation target indicated by the post information.

An evaluation method according to a second aspect of the present invention is an evaluation method in an evaluation device including a selection unit and an evaluation unit, the evaluation method including, at the selection unit, selecting, from a group of pieces of post data including a plurality of pieces of post data each including post information indicating a post content related to an evaluation target and poster information indicating a user who has posted the post information, based on a user index that indicates an index related to the user and becomes greater for the user, indicated by the poster information, with a larger number of pieces of the post information of the user posted in past and with a larger number of pieces of the post information adopted as information having a predetermined reliability or higher, the post data with the user index being equal to or greater than a threshold; and at the evaluation unit, evaluating whether the evaluation target exists, based on the post data selected by the selection unit.

A program according to a third aspect of the present invention is a program for causing a computer to function as units in the evaluation device described above.

An evaluation update device according to a fourth aspect of the present invention includes an evaluation unit configured to generate again, when an evaluation information index representing an index provided to evaluation information when the evaluation information is generated drops equal to or below a threshold related to the evaluation information index, the evaluation information for an evaluation target representing evaluation on the evaluation target, the evaluation information index becoming lower as time elapses from a point when the evaluation information was generated, the evaluation information index becoming lower with lower voting information indicating whether the evaluation information is appropriate, the evaluation information based on post information that is different from the post information indicating a post content for the evaluation target used for generating the evaluation information for the evaluation target.

The evaluation update device may further include a request unit configured to request a plurality of users for posting of the post information when the evaluation information drops equal to or below the threshold related to the evaluation information index.

The evaluation information index may be a reliability of the evaluation information generated based on the voting information indicating whether the evaluation information is appropriate.

The evaluation information index may be an acquisition level of the evaluation information, the acquisition level being generated based on number of pieces of the evaluation information in a predetermined region.

An evaluation update method according to a fifth aspect of the present invention is an evaluation update method in an evaluation update device including an evaluation unit, the evaluation update method including, at the evaluation unit, generating again, when an evaluation information index representing an index provided to evaluation information when the evaluation information is generated drops equal to or below a threshold related to the evaluation information index, the evaluation information for an evaluation target representing evaluation on the evaluation target, the evaluation information index becoming lower as time elapses from a point when the evaluation information was generated, the evaluation information index becoming lower with lower voting information indicating whether the evaluation information is appropriate, the evaluation information based on post information that is different from the post information indicating a post content for the evaluation target used for generating the evaluation information for the evaluation target.

A program according to a sixth aspect of the present invention is a program for causing a computer to function as units in the evaluation update device described above.

Effects of the Invention

As described above, the evaluation update device, method, and program according to the present invention provides an effect of enabling evaluation information on an evaluation target to be appropriately updated in accordance with a post of the user related to the evaluation target.

BRIEF DESCRIPTION OF DRAWINGS

FIG. 3 is a diagram illustrating a group of pieces of post data according to the present embodiment;

FIG. 5 is a diagram illustrating an example of a clustering rule.

FIG. 8 is a diagram illustrating a specific example of clustering.

FIG. 10 is a diagram illustrating a user reliability according to the present embodiment.

FIG. 12 is a diagram illustrating post information count.

FIG. 16 is a diagram illustrating the number of posts of the post information posted by the user and the number of information pieces adopted as the evaluation information.

FIG. 17 is a diagram illustrating a reliability of the evaluation information.

FIG. 18 is a diagram illustrating calculation for the reliability of the evaluation information based on voting information of the user.

FIG. 23 is a diagram illustrating a specific example of an acquisition level according to a second embodiment.

DESCRIPTION OF EMBODIMENTS

Hereinafter, an example of an embodiment for performing the present disclosure will be described in detail with reference to the drawings.

Overview of the Present Embodiment

Figure 1:
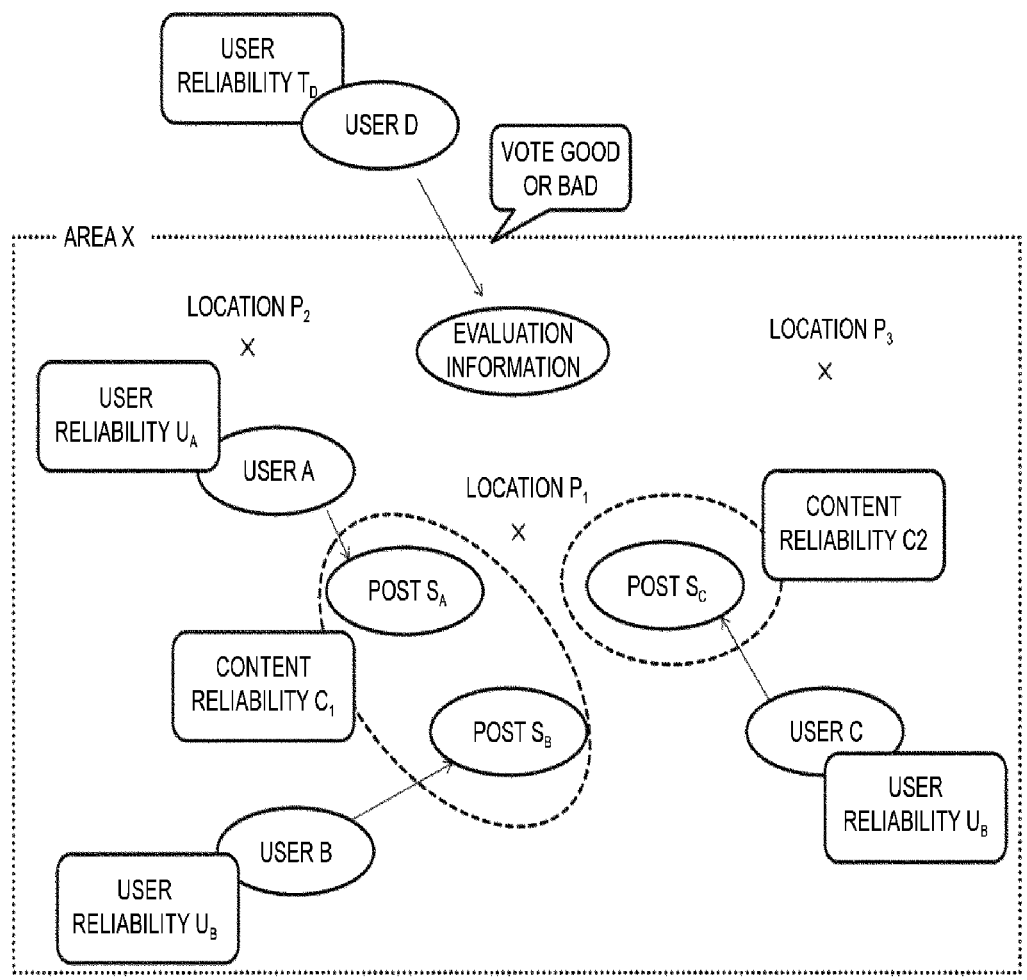
FIG. 1 is a diagram illustrating an overview of the present embodiment.

FIG. 1 is a diagram illustrating an embodiment of the present invention. In the present embodiment, evaluation is made on post information, related to an evaluation target, generated by a plurality of users. In the present embodiment, posts are made for each of locations $P_1$, $P_2$, and $P_3$ that are examples of the evaluation target. For example, post information pieces SA, SB, and Sc have been posted for the location $P_1$ by users A, B, and C. In the present embodiment, the post information pieces are evaluated by clustering the post information pieces, and evaluating whether each cluster comprises valid post information pieces, based on user reliabilities $U_A$, $U_B$ that are examples of indices related to the posted user, and $U_C$ and of content reliabilities $C_A$, $C_B$, and $C_C$ that are example of indices related to post information posted by the user. Then, when the cluster is determined to be a cluster comprising valid contents, and post information of the cluster is adopted as the evaluation information. Furthermore, the user reliability is updated in accordance with an extraction result, to generate appropriate evaluation information for any evaluation target.

The evaluation information that has been adopted as information with a certain level of reliability may change to be an invalid content overtime. In view of this, in the present invention, the evaluation information is reevaluated based on a voting by a plurality of users (voting good or bad) and an elapse of time. For example, in the example illustrated in FIG. 1, the user D votes whether the evaluation information on the location $P_1$ is good or bad. In the present embodiment, reliability E of the evaluation information is updated based on this voting information and elapsed time. When the reliability E drops equal to or below a predetermined threshold, a request for more posting from users to the location $P_1$ is issued. The evaluation information is reevaluated by using the evaluation information that is currently likely to be appropriate. Thus, the evaluation information for any evaluation target may be maintained to be appropriate.

In the present embodiment, the evaluation processing of generating evaluation information from post information and evaluation update processing of prompting posting and updating the evaluation information are repeated. Detailed description will be given below.

First Embodiment

Configuration of Evaluation System

Figure 2:
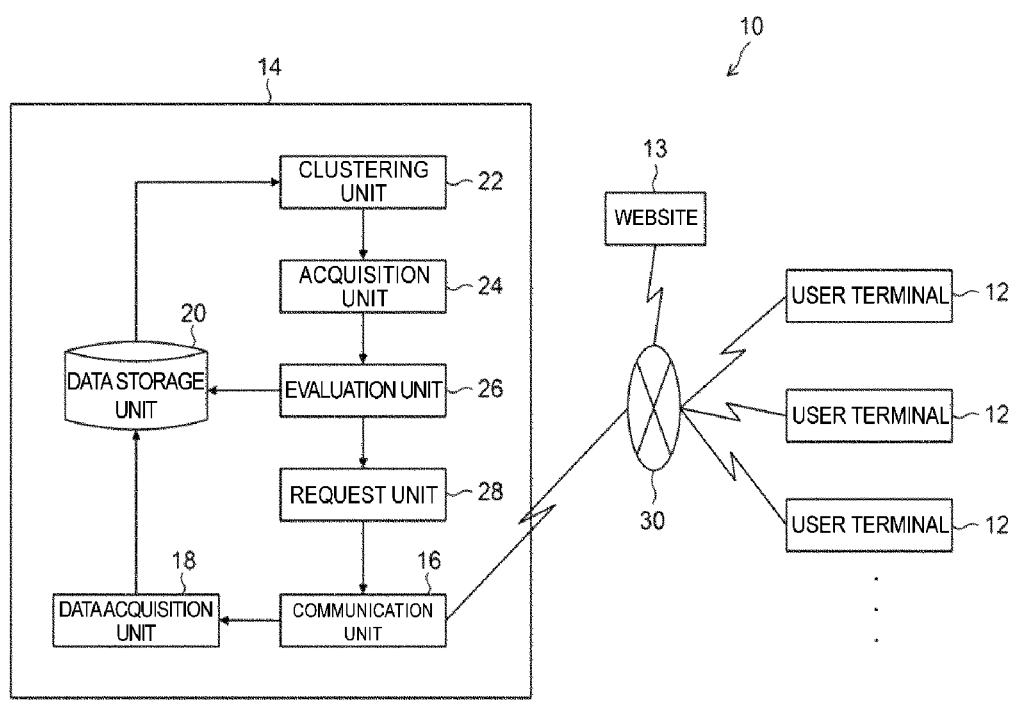
FIG. 2 is a block diagram illustrating an example of a configuration of an evaluation system according to the present embodiment.

FIG. 2 is a block diagram illustrating an example of a configuration of an evaluation system 10 according to a first embodiment. As illustrated in FIG. 2, the evaluation system 10 according to the present embodiment includes a plurality of user terminals 12 and an evaluation device 14. The plurality of user terminals 12 and the evaluation device 14 are connected to each other through a predetermined communication means 30 (such as the Internet, for example).

The plurality of user terminals 12 and the evaluation device 14 each include a computer including a central processing unit (CPU), a random access memory (RAM), and a read only memory (ROM) storing a program for executing a learning processing routine.

The user terminal 12 is operated by any user. The user operates the user terminal 12 to generate post information indicating a post content related to the evaluation target. The user terminal 12 posts the post information on a website 13 by means of the communication means 30 for example. Note that, when the post information is posted, poster information indicating the user of the user terminal 12 and position information on the evaluation target for which the post information has been generated are posted together on the website 13.

The user terminal 12 adds voting information indicating the content of voting for the post information (or the evaluation information described later), to the post information posted on the website 13, in response to an operation by the user. In this way, the user can vote good or bad to the post information and can vote good or bad for the evaluation information (see FIG. 1). The voting information will be described later.

The evaluation device 14 collects post data indicating a combination of the post information posted from the plurality of user terminals 12, the poster information, and the position information. Then, the evaluation device 14 evaluates the evaluation target indicated by the post information in the post data.

As illustrated in FIG. 2, the functions of the evaluation device 14 include a communication unit 16, a data acquisition unit 18, a data storage unit 20, a clustering unit 22, an acquisition unit 24, an evaluation unit 26, and a request unit 28.

The communication unit 16 executes communication processing. Specifically, the communication unit 16 receives each post data posted to the website 13 from the plurality of user terminals 12.

The post data of the present embodiment includes the post information indicating a post content related to the evaluation target, the poster information indicating the user who posted the post information, and the position information on the evaluation target. The description of the present embodiment is given for an example where the evaluation target is a location.

The data acquisition unit 18 acquires the post data received by the communication unit 16. Then, the data acquisition unit 18 stores the acquired post data in the data storage unit 20.

The data storage unit 20 stores a group of pieces of post data including a plurality of pieces of post data acquired by the data acquisition unit 18. FIG. 3 is a diagram illustrating a group of pieces of post data according to the present embodiment.

The group of pieces of post data according to the present embodiment is managed in a table format as illustrated in FIG. 3 for example. Specifically, as illustrated in FIG. 3, data including a combination of poster information indicating the posted user, position information of the location as the evaluation target, and post information on the location is stored as one post data. The table illustrated in FIG. 3 also stores the voting information for the post data, a storage date of the post data, and check for the post data. The post data check will be described later.

Note that the poster information is expressed by a character string (such as an ID or a number for example). The position information is expressed by a continuous value or a character string. The position information is expressed by an ID, a number, or the like when it is expressed using a character string, and is expressed by coordinates (a set of latitude and longitude) when it is expressed using a continuous value. The post information and the voting information are expressed using a character string.

It is assumed that the poster information and the position information are required for storing the post data, and one of the post information and the voting information includes a value. It is further assumed that a required input and optional input can be designated for each item in the post information, when the post information is posted on the website 13. Thus, it is assumed that the required input definitely has a value, and the optional input may not have a value.

The post data storage date is used when collecting posts. The post data check is adopted when the number of posts from the user as the poster, counting the number of pieces of the post information from the user that have been adopted as the evaluation information, collecting the posts, and the like. A check field will be described later.

The clustering unit 22 acquires a group of pieces of post data stored in the data storage unit 20. The clustering unit 22 then clusters the plurality of pieces of post data into a plurality of clusters, based on at least one of the position information and the post information of post data in the group of pieces of post data.

Known clustering techniques include hierarchical clustering and non-hierarchical clustering. In the hierarchical clustering, a dendrogram is generated and so that the number of clusters need not be predetermined. The hierarchical clustering includes Ward method, group average method, and the like. On the other hand, in the non-hierarchical clustering, the number of clusters needs to be determined advance. Known non-hierarchical clustering includes k-means, fuzzy c-means, and the like. It should be noted that generally, the number of clusters is unknown before the clustering is performed.

Figure 4:
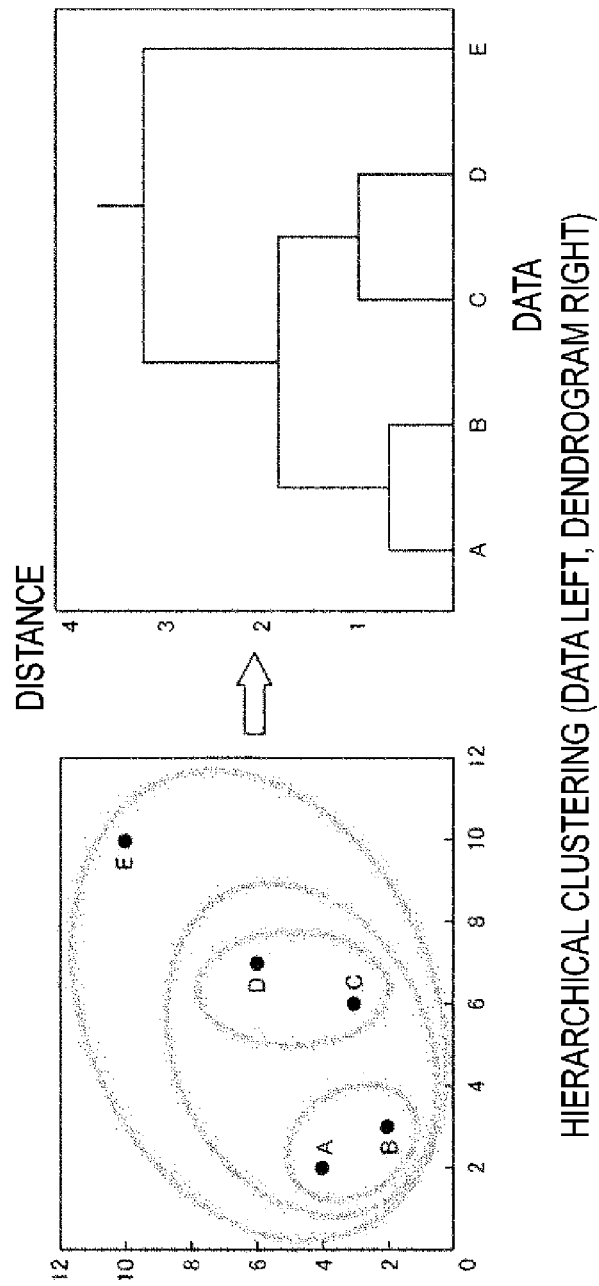
FIG. 4 is a diagram illustrating clustering according to the present embodiment.

Thus, in the present embodiment, clustering is performed using hierarchical clustering. FIG. 4 is a diagram illustrating hierarchical clustering. As illustrated in FIG. 4, in the hierarchical clustering, at least one cluster includes a plurality of clusters. Also, in the hierarchical clustering, clustering is performed based on similarity among the plurality of pieces of post data. Specifically, as illustrated in FIG. 4, post data pieces with a distance, indicating the similarity therebetween, being short are classified into the identical cluster. For example, if a threshold related to the distance is set to be 1, post data from the user A and post data from the user B are classified into the identical cluster in the dendrogram illustrated in FIG. 4. For example, if the threshold related to the distance is set to be 3, post data pieces from users A, B, C, and D are classified into the identical cluster in the dendrogram illustrated in FIG. 4.

FIG. 5 is a diagram illustrating an example of a clustering rule for the hierarchical clustering according to the present embodiment. In the present embodiment, clustering is performed through the identical hierarchical clustering with the threshold changed, using at least one of the position information and the post information in the post data.

Specifically, in the present embodiment, clustering is performed with the following requirements (1) to (3) satisfied.

(1) Clustering rules are managed while being identified as Nos. 1, 2, and 3, and the clustering is performed in the designated order.
(2) The used item, value, and threshold need to be designated.
(3) When the value is a character string, quantification processing is executed, and then the clustering is executed.

Note that, as illustrated in FIG. 5, in a case where the used item is the post information with a character string designated as the value, the weighting priorities (first to n-th categories) can be specified for the clustering rule.

As illustrated in FIG. 5, the used item in the clustering according to the present embodiment includes the position information or the post information in the post data. In the example illustrated in FIG. 5, for example, a rule provided with identification information No. 1 indicates that the position information is used as the used item in the clustering, and that the clustering is performed in accordance with a character string indicating the position information. Note that the threshold is set to be "1.0" in this case.

For example, a rule provided with identification information No. 3 indicates that the post information is used as the used item in the clustering, and that the clustering is performed in accordance with a character string indicating the post information. Note that the threshold is set to be "12.0" in this case.

Figure 6:
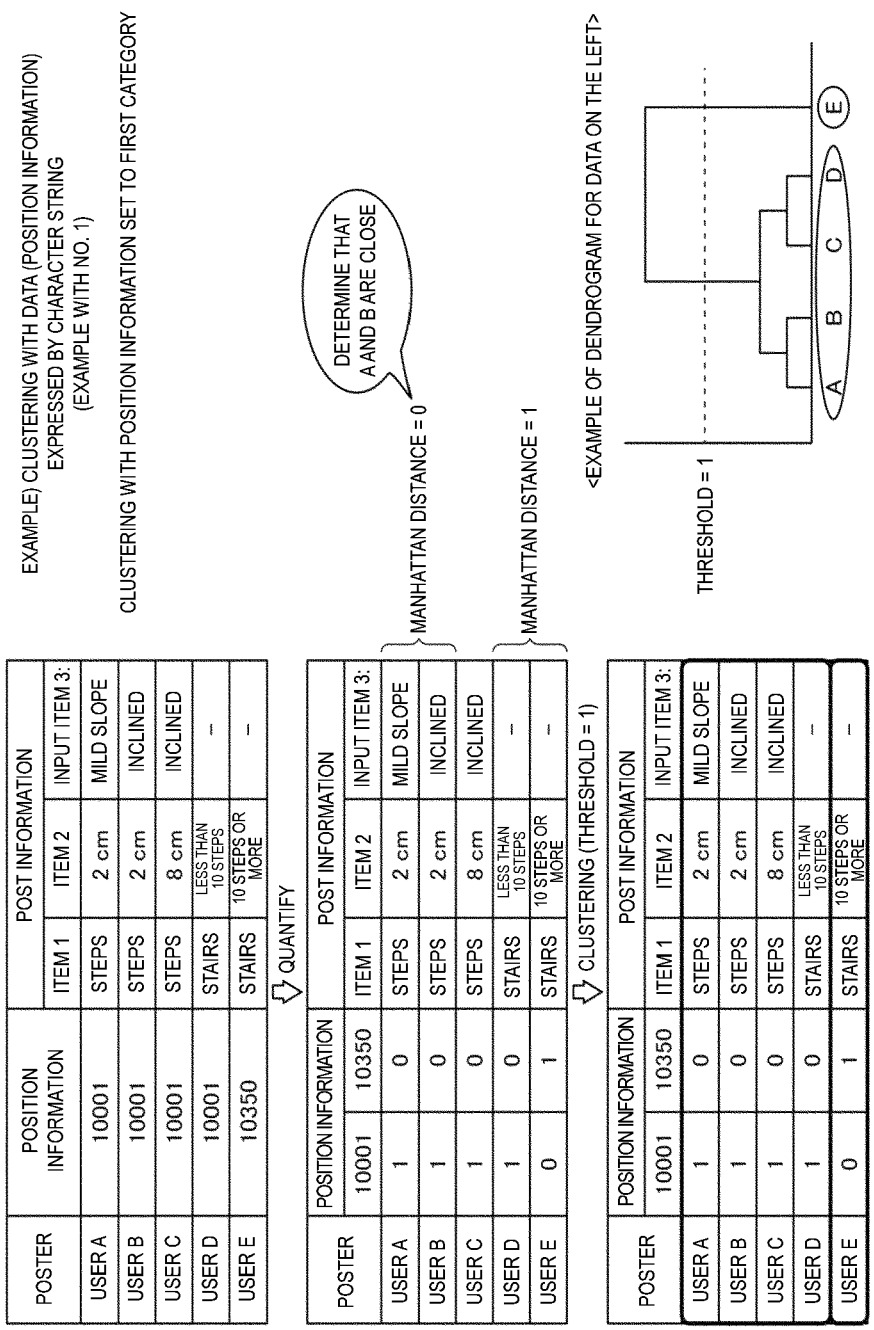
FIG. 6 is a diagram illustrating a specific example of clustering.

FIG. 6 is a diagram illustrating a specific example of hierarchical clustering. FIG. 6 illustrates an example of clustering with the rule No. 1 illustrated in FIG. 5 applied. As illustrated in FIG. 5 described above, according to the rule No. 1, the position information is set to be the used item, whereby clustering is performed in accordance with the position information.

In the example illustrated in FIG. 6, the position information corresponding to users A to D is "10001," and the position information corresponding to a user E is "10350." In this case, as illustrated in FIG. 6, "10001" and "10350" are quantified values of the position information of these users, and "1" and "0" indicates which of "10001" and "10350" each user belongs. With this position information, the post data from the user A and the post data from the user B are at a Manhattan distance=0 for example, and thus are determined to be in close distance to each other. On the other hand, the post data from the user D and the post data from the user E are at a Manhattan distance=1. In this case, when the threshold is set to be 1, A, B, C, and D are classified into the identical cluster as in the right side part in FIG. 6, and the clustering results in the two clusters that are a cluster including A, B, C, and D and a cluster including E.

Figure 7:
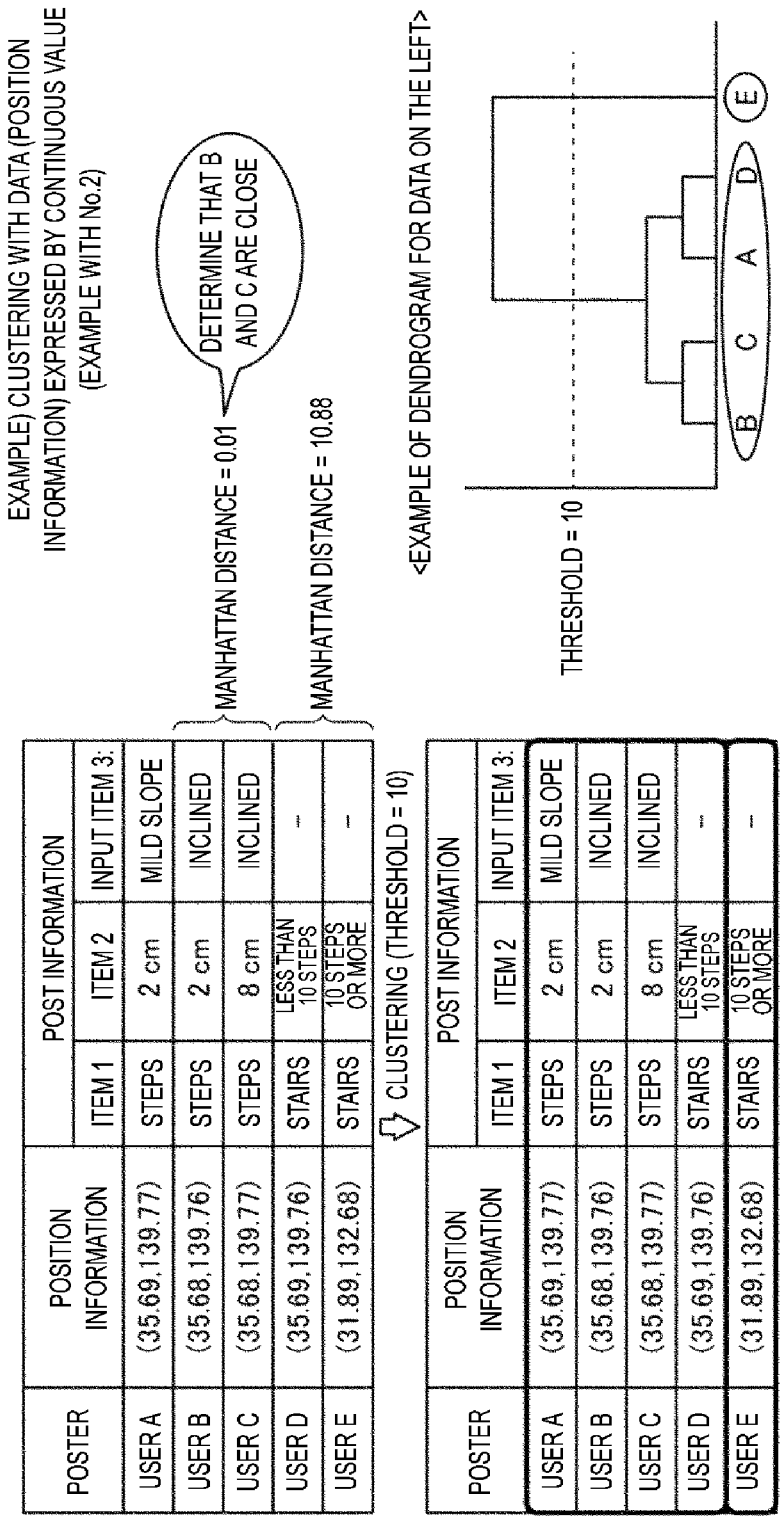
FIG. 7 is a diagram illustrating a specific example of clustering.

FIG. 7 illustrates an example of clustering in a case where a rule No. 2 illustrated in FIG. 5 described above is applied. According to the rule No. 2, the position information is set to be the used item, whereby clustering is performed in accordance with the position information. Note that, according to the rule No. 2, the position information is expressed with a continuous value.

In the example illustrated in FIG. 7, the position information corresponding to the users A to D is expressed with a continuous value. With this position information in this case, the post data from the user B and the post data from the user C are at a Manhattan distance=0.01, and thus are determined to be in close distance to each other. On the other hand, the post data from the user D and the post data from the user E are at a Manhattan distance=10.88. In this case, when the threshold is set to be 10, A, B, C, and D are classified into the identical cluster, and the clustering results in the two clusters that are a cluster including A, B, C, and D and a cluster including E as in the right side part in FIG. 7.

FIG. 8 illustrates an example of clustering in a case where a rule No. 3 illustrated in FIG. 5 described above is applied. With the rule No. 3, the post information is set to be the used item, an item 1 is set to be the first category, an item 2 is set to be the second category, and an item 3 is set to be the third category. In this case, clustering is performed based on the items 1, 2, and 3 of the post information.

In the example illustrated in FIG. 8, the items 1, 2, and 3 of the post information include information indicating the location as the evaluation target. In this case, as illustrated in FIG. 8, quantization of the items 1, 2, and 3 of the post information results in the third category being expressed by "1" or "0", the second category being expressed by "3" or "0", and the first category being expressed by "12" or "0". Here, a higher category is provided with a weight that is maximum distance of sub-category+1.

In this case, the post data from the user A and the post data from the user B are at a Manhattan distance=2, and thus are determined to be in close distance to each other. On the other hand, the post data from the user B and the post data from the user C are at a Manhattan distance=6. In this case, when the threshold is set to be less than 12, the classification is based on the first category. When the threshold is set to be less than 3, the classification is based on the second category. For example, clustering performed with the threshold set to be 3 results in A and B being classified into the identical cluster, and in three clusters including the cluster including A and B, a cluster including C, and a cluster including D, as in the right side part in FIG. 8. On the other hand, clustering performed with the threshold being set to be 12 results in A, B, and C classified into the identical cluster, and results in two clusters that are a cluster including A, B, and C and a cluster including D as in right-hand side of FIG. 8.

The acquisition unit 24 calculates, for each cluster as a result of the clustering by the clustering unit 22, an average of user reliabilities of the plurality of pieces of post data belonging to the cluster. Then, the acquisition unit 24 acquires a cluster whose average of user reliabilities is equal to or higher than a threshold related to the user reliability. Note that the user reliability level is an example of a user index.

The user reliability according to the present embodiment increases with the number of pieces of post information posted by the user in the past, and with the number of pieces of post information posted by user adopted as information with a predetermined level of reliability or higher. Note that the post information that is adopted as information with a predetermined level of reliability or higher serves as the evaluation information described later. The following Formula (1) is for calculating the user reliability according to the present embodiment.

User Reliability=δ×2×(contribution rate)×(adoption rate)/{(contribution rate)+(adoption rate)}   (1)

Note that the contribution rate and the adoption rate in Formula (1) described above are expressed by the following Formula (2).

[Math. 1]

$$(\text{Contribution rate}) = 1 \bigg/ \left(1 + e^{\frac{a(\mu - m_i)}{\sigma}}\right) \quad (2)$$

$$(\text{Adoption Rate}) = (n_i + 1)/(m_i + 1)$$

In the formulae, δ is 1 pr a determination score for bot detection. The determination score for bot detection will be described later. Furthermore, a represents a preset constant, μ represents the average of the number of post information pieces posted by a plurality of users, mi represents the number of posts from a user i, and σ represents the standard deviation of the number of posts. Furthermore, $n_i$ represents the number of post information pieces from the user i adopted as the evaluation information.

Figure 9:
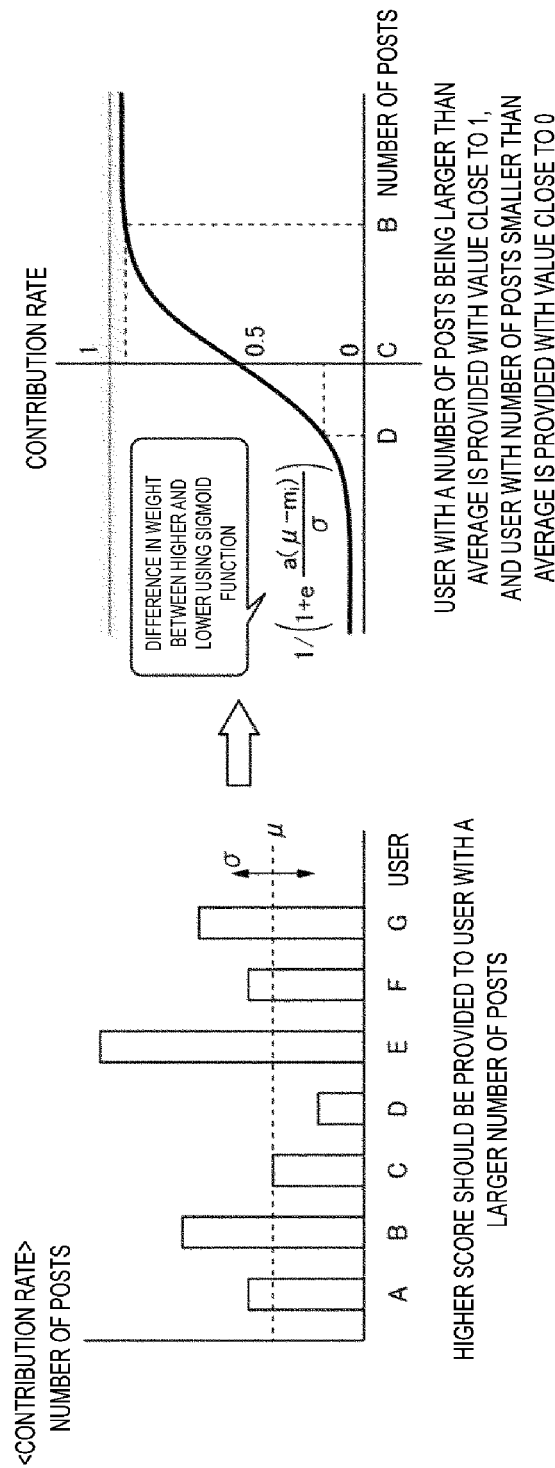
FIG. 9 is a diagram illustrating a user reliability according to the present embodiment.

FIG. 9 is a diagram illustrating the contribution rate in Formula (1) described above. Preferably, a user posting a large number of post information pieces is provided with a higher user reliability. Thus, as illustrated in FIG. 9, in the present embodiment, the user with the number of posts being higher than average is provided with a contribution rate that is close to 1, and a user with the number of posts being smaller than average is provided with a contribution rate close to 0.

FIG. 10 is a diagram illustrating the user reliability. In the example illustrated in FIG. 10, the number of posts, the adoption count indicating the number of posts adopted as the evaluation information, contribution rate, adoption rate, and user reliability about user A, B, C, and D are illustrated. Note that in the example illustrated in FIG. 10, the average number of posts of the entire users μ=1.0, variance σ=0.8, and a=2.0 hold.

As can be seen in FIG. 10, the higher contribution and adoption rates result in a value of the user reliability closer to 1. In addition, even when the number of posts of post information is large, the user reliability is low if the adoption count indicating the number of the post information pieces adopted as the evaluation information is small. In the initial state (the number of posts=0 and the adoption count=0 for example), the user reliability is a constant (0.7 for example). In addition, when the user reliability is calculated, the user reliability for each area can be calculated by calculating the average number of posts and variance of the number of posts for each area including each location.

Figure 11:
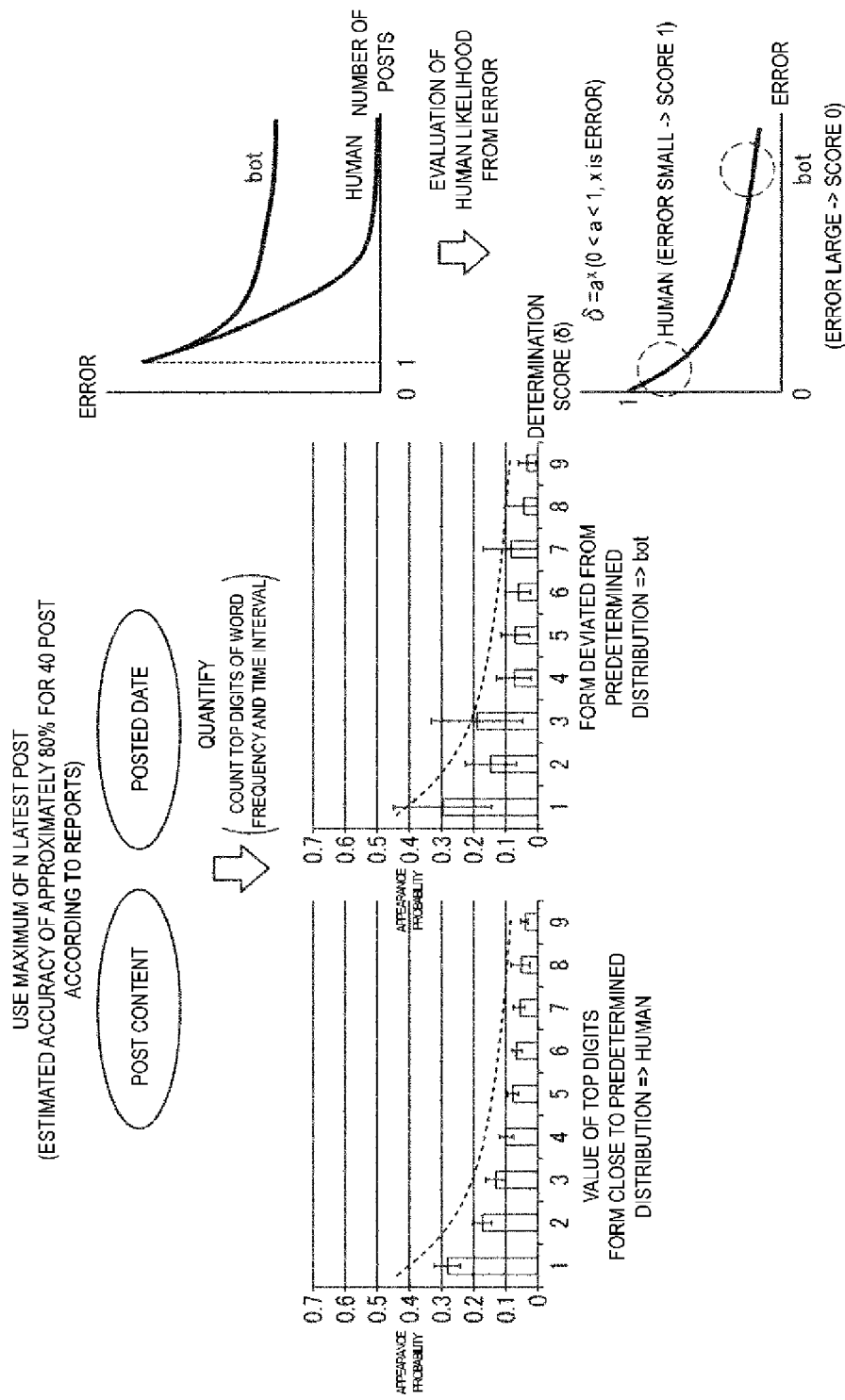
FIG. 11 is a diagram illustrating a method of detecting whether a user is a bot.

FIG. 11 is a diagram illustrating a method of calculating a determination score indicating whether the user is a bot. The bot detection described below is based on a reference (Yuki Kurauchi, four others, "Bot account detection using Bendford's law", a collection of papers, the Database Society of Japan, DBSJ journal 12(1), 19-24, 2013-06, [searched on Aug. 13, 2018], Internet <URL:http://db-event.jpn.org/deim2013//proceedings/pdf/b1-2.pdf>).

As illustrated in FIG. 11, according to the technique described in the reference document, whether a user is a bot or human is determined based on the post content and post date and time. The technique described in the reference document relates to a model with estimation accuracy improved by daily posts, and thus can be used for the user reliability according to the present embodiment. In the technique described in the reference document the maximum of N latest posts are used, and 80% estimation accuracy is reported for a case where the number of posts is about 40.

Quantification of the user's posts (for example, counting the top digits of the word frequency and counting the number of top digits of the time intervals) results in graphs with different shapes representing human and bot as illustrated on the left side of FIG. 11. The horizontal axis of the two graphs on the left-hand side of FIG. 11 represents the numerical value of the top digits of the word frequency or the top digits of the time intervals. For example, in a case of time intervals 16, 24, and 37, the numerical value of the top digits of the time intervals are "1", "2", and "3". In a case where word frequencies are 17, 25, and 48, the top digits of the word frequencies are "1", "2", and "4".

Of the two graphs in the left side part in FIG. 11, the left one indicates the appearance probability related to the posting time interval or the word frequency in a case of human. Furthermore, of the two graphs in the left side part in FIG. 11, the right one indicates the appearance probability related to the posting time interval or the word frequency in a case of bot. The left one of the two graphs in the left side part in FIG. 11 includes a shape close to the dotted line, whereas the right one of the two graphs in the left side part in FIG. 11 includes a shape less conforming to the dotted line. Thus, whether the post is from a person or a bot can be determined based on whether the shape is close the dotted line representing a predetermined distribution, or is less conforming to the dotted line representing a predetermined distribution.

In this case, as illustrated in the right graph in FIG. 11, an error between the predetermined distribution and the distribution of appearance probability of the posting time interval or the distribution of appearance probability of the word frequency decreases as the number of posts increases. In this case, an increase in the number of posts results in the error related to human posts being smaller than an error related to bot posts.

In view of this, in the present embodiment, the determination score δ representing a human likelihood is calculated based on the error. Specifically, as illustrated in FIG. 11, the determination score δ representing the human likelihood is calculated by the formula 6=ax. Note that this "x" represents an error. Thus, the determination score δ representing the human likelihood may be appropriately calculated.

Note that in the present embodiment, the post information is counted based on the number of users included in each cluster of the post information. For example, as illustrated in a lower part of FIG. 12, even if the identical person (user D) repeatedly post the identical contents, the total number of users is counted to be four, the number of users answered "steps" for the location is counted to be three, and the number of users answered "stairs" is counted to be one. Thus, based on the first category, the total number of users is counted to be four (n=4), the user answered "steps" is counted to be three (r=3), and the number of users answered "stairs" is counted to be 1.

The evaluation unit 26 evaluates whether there is the target of the evaluation target, based on the post data of the cluster acquired by the acquisition unit 24. For example, if the post information only includes "stairs" and "steps", it can be determined that that there is an evaluation target representing "stairs" or "steps", and that "restroom" is not included.

The evaluation unit 26 evaluates the likelihood of the property of the evaluation target based on the post data of the cluster acquired by the acquisition unit 24. Specifically, the evaluation unit 26 calculates, based on the post information of the post data of the cluster acquired by the acquisition unit 24, content reliability that is one example content index that is an index related to the post information, as the likelihood of the property of the evaluation target.

More specifically, the evaluation unit 26 calculates the content reliability based on the probability obtained for each combination between the information on an event related to the evaluation target and the information on the evaluation target indicated by the post information.

Figures 13, 14:
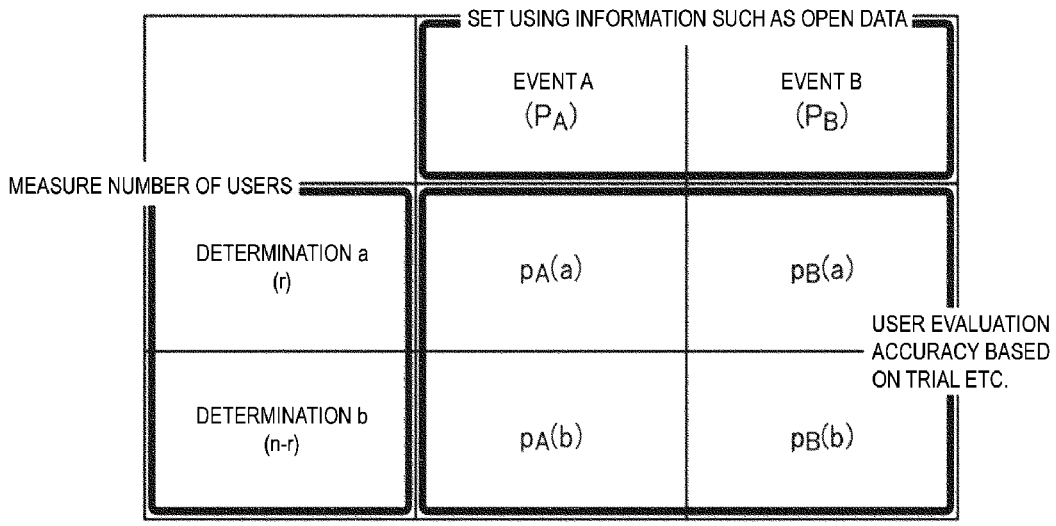
FIG. 13 is a diagram illustrating a probability for obtaining content reliability.
FIG. 14 is a diagram illustrating a specific example of calculation for content reliability.

FIG. 13 is a diagram illustrating each probability for obtaining the content reliability according to the present embodiment. In the present embodiment, the content reliability is calculated by using probability statistics. Specifically, as illustrated in FIG. 13, an event A is defined as "a: with barrier θ", and event B is defined as "b: without barrier θ".

The probability of the event A occurring at any location is defined as probability $P_A$, and the probability of the event B occurring at any location is defined as probability $P_B$. The user as the poster determines a or b at the location where the event A, B occurs. The probabilities of a and b appearing in the post information are defined as $p_A(a)$, $p_A(b)$, $p_B(a)$, and $p_B(b)$. Note that the information on the events A and B is set from information such as open data. Furthermore, the number of users n is obtained by measurement. Furthermore, $p_A(a)$, $p_A(b)$, $p_B(a)$, and $p_B(b)$ are set in advance based on the accuracy of the user evaluation obtained through trial or the like.

Now a probability $q_x(A)$ of the A actually occurring at a location where r users among n users have determined the occurrence of the event A is considered. In this case, the probability $q_x(A)$ can be calculated by the following Formula (3) using the Bayes theorem.

[Math. 2]

$$q_x(A) = \frac{P_A p_A(x)}{\sum_{i \in (A,B)} P_i p_i(x)} = \frac{P_A \binom{n}{r} p_A(a)^r p_A(b)^{n-r}}{\sum_{i \in (A,B)} P_i \binom{n}{r} p_i(a)^r p_i(b)^{n-r}} \quad (3)$$

Next, an example of calculation for content reliability will be described with reference to FIG. 14. As illustrated in FIG. 14, for example, a probability of the event A (steps) occurring at any location is defined as $P_A=0.3$. In this case, the probability of the event A not occurring, that is, a probability of steps not existing at any location is $P_B=0.7$.

Furthermore, a probability of a person determining a at the location with the event A (determining "steps" at the location with "steps" for example) is defined as $P_A(a)=0.9$. Furthermore, a probability of a person determining b at the location with the event B (determining "steps" at the location without "steps") is defined as $P_B(a)=0.1$. Furthermore, as illustrated in FIG. 14, among four users, three users (r=3) is assumed to have determined a. FIG. 14 illustrates each probability in this case.

In this case, the content reliability is calculated by the following Formula (4):

[Math. 3]

$$\text{Content reliability} = \frac{0.3 \times \binom{4}{3} \times 0.9^3 \times 0.1^1}{0.3 \times \binom{4}{3} \times 0.9^3 \times 0.1^1 + 0.7 \times \binom{4}{1} \times 0.1^3 \times 0.9^1} \quad (4)$$

$$= \frac{0.3 \times 4 \times 0.7290 \times 0.1}{0.3 \times 4 \times 0.7290 \times 0.1 + 0.7 \times 4 \times 0.0010 \times 0.9}$$

$$= \frac{0.08748}{0.08748 + 0.00252}$$

$$= 0.972$$

Note that each of the probabilities shown in FIG. 14 may update the value in a bit wise manner in accordance with the daily update status. For example, the probability $P_A(a)$ can be updated as in the following Formula (5). Note that a is a preset coefficient.

$$P_A(a) \leftarrow P_A(a) + \alpha \quad (5)$$

Then, the evaluation unit 26 adopts as the evaluation information, post information of the post data with the content reliability that is equal to or higher than the threshold related to the content reliability, among the post data pieces in the cluster acquired by the acquisition unit 24.

Note that the evaluation information according to the present embodiment is information indicating a combination of the ID for identifying the evaluation information, the position information of the post data adopted as the evaluation information, extracted information indicating the post information of post data adopted as the evaluation information, the poster information related to the post data adopted as the evaluation information, and voting information for the evaluation information. The data structure of the evaluation information will be described later.

Figure 15:
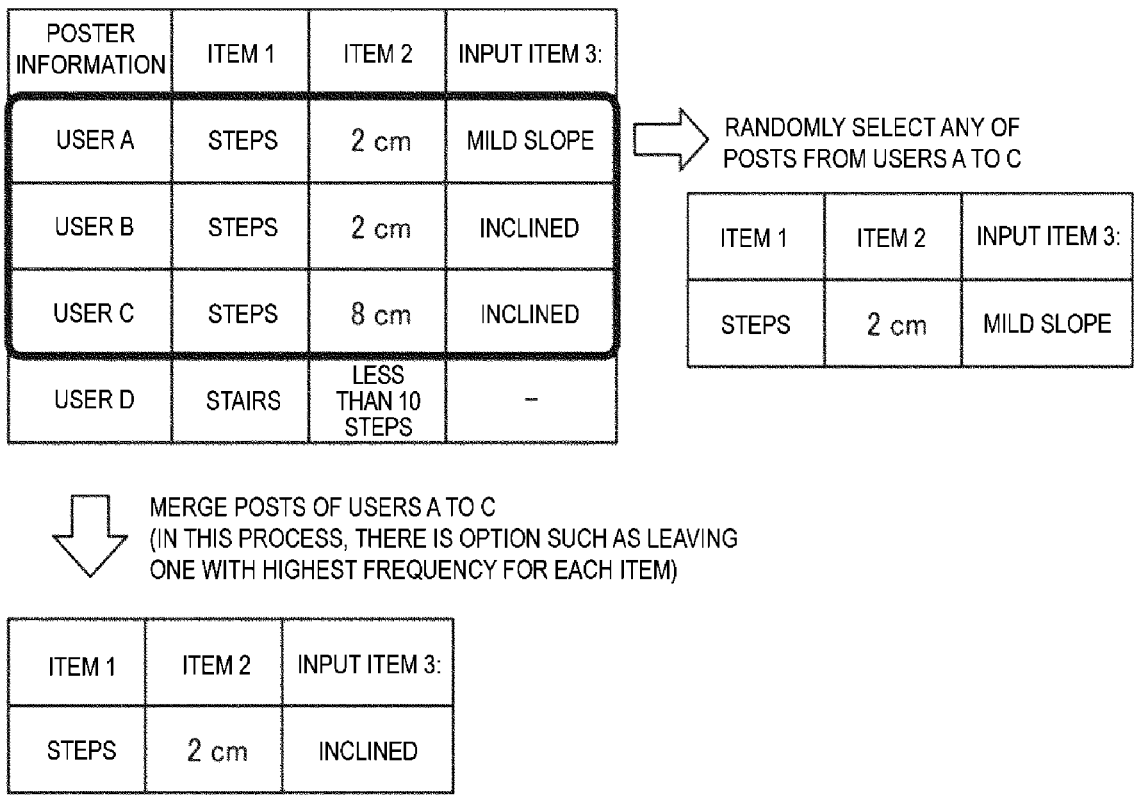
FIG. 15 is a diagram illustrating evaluation information integration.

Next, the evaluation unit 26 generates one evaluation information for one location. FIG. 15 is a diagram illustrating how one evaluation information is generate for one location. For example, if the number of posted post information is one, the evaluation unit 26 makes (post information)=(evaluation information) hold. On the other hand, when there is two pieces of post information or more as in a case illustrated in FIG. 15 where the post information pieces from the users A, B, and C are adopted as the evaluation information, the evaluation unit 26 generates one evaluation information from a plurality of pieces of post information. For example, as illustrated in FIG. 15, the evaluation unit 26 randomly selects one of the plurality of pieces of post information. Alternatively, for example, as illustrated in in FIG. 15, the evaluation unit 26 integrates a plurality of posts into one.

The evaluation unit 26 stores the evaluation information in the data storage unit 20. FIG. 16 illustrates an example of the evaluation information stored in the data storage unit 20. As illustrated in FIG. 16, the ID and poster information for identifying the evaluation information are expressed by a character string (such as alphanumeric characters for example). Furthermore, the position information is assumed to be a continuous value or a character string, and extracted information and the voting information are assumed to be a character string. Note that the extracted information corresponds to the post information of the post data. When a character string is used, the information is expressed by ID, a number, or the like. When a continuous value is used, the information is expressed by coordinates (a set of latitude and longitude for example). The poster information, the position information, and the extracted information are essential, and the voting information is good, bad, or no value. The extracted information includes an item with a value, and an item without a value. The evaluation information according to the present embodiment is managed by a table such as that illustrated in FIG. 16. Note that the storage date and check in the table storing the evaluation information is used for calculating the reliability of the evaluation information described later.

FIG. 17 illustrates post data and evaluation information stored in the data storage unit 20. In the present embodiment, post data and evaluation information are managed by a data structure as illustrated in FIG. 17.

Next, the evaluation unit 26 updates the number of posts of the post information posted by the user and the adoption count indicating the number of information pieces adopted as the evaluation information, used for calculating the user reliability. The update processing by the evaluation unit 26 results in updating the number of posts and the adoption count illustrated in FIG. 10 described above, and also results in updating the contribution rate, the adoption rate, and the user reliability.

FIG. 18 is a diagram illustrating the number of posts of the post information posted by the user and the number of information pieces adopted as the evaluation information. As illustrated in FIG. 18, in the present embodiment, the post information of each user included in each cluster of post information is counted.

FIG. 18 illustrates a case where the post information from the users A, B, and C is adopted as the evaluation information, and the post information from the user D is not adopted. In this case, the number of posts of post information from users A, B, and C is incremented by one, and the adoption count indicating the number of post information pieces adopted as the evaluation information is also incremented by one. On the other hand, the number of posts of the post information from the user D is incremented by one, but the adoption count indicating the number of post information pieces adopted as the evaluation information is not incremented.

In the lower part of FIG. 18, a case is described where the identical user post a plurality of the identical post information pieces. In this case, the number of posts of post information from the users A, B, and C is incremented by one, and the adoption count indicating the number of post information pieces adopted as the evaluation information is also incremented by one. On the other hand, the number of posts of the post information from the user D is incremented by six but the adoption count indicating the number of post information pieces adopted as the evaluation information is not incremented.

When the plurality of pieces of post information from the user D in the lower part of FIG. 18 are adopted as the evaluation information, the number of posts of the post information from the user D is incremented by six. However, the adoption count indicating the number of post information pieces adopted as the evaluation information is incremented by one because the contents of the post information pieces are the same (however, posts counted on different post dates are counted separately).

When the update of the number of posts of the post information from the user and the adoption count indicating the number of post information pieces from the user adopted as the evaluation information is completed, the evaluation unit 26 updates the table of the group of pieces of post data stored in the data storage unit 20 with the adopted post information regarded as checked (the post information not adopted remains to be unchecked).

Next, the evaluation unit 26 calculates the reliability of the evaluation information based on the voting information indicating the contents of voting for the evaluation information from the plurality of users. The reliability of the evaluation information according to the present embodiment is expressed by the following Formula (6).

[Math. 4]

$$r_j = r_j^0 \times c_j \times e^{-\lambda t} \quad (6)$$

Note that t in Formula (6) described above represents the number of days elapsed from the posting of the post information. Note that $r_j^0$ represents a predetermined constant. Note that $c_j$ represents the weight according to the content of the voting information (good indicating appropriate and bad indicating inappropriate). Note that $e^{-\lambda t}$ is a section representing the freshness of the voting information, where $\lambda$ is a preset constant. The content reliability at the time of adoption as the evaluation information is set to be the initial value of the constant $r_j^0$.

With the weight $c_j$ for the voting information for the evaluation information from the plurality of users, the deterioration rate of the reliability of the evaluation information is determined in accordance with the number of votes (good or bad) for the evaluation information j. The weight $c_j$ is expressed by, for example, Formula (7) below.

[Math. 5]

$$c_j = \sum_{k=1}^{N} c_j^k / N \text{ where } c_j^k = \begin{cases} 1 \text{ (when voted good)} \\ 0 \text{ (when voted bad)} \end{cases} \quad (7)$$

Note that the evaluation unit 26 calculates the reliability of the evaluation information based on the voting information of the user whose user reliability is equal to or larger than a predetermined threshold.

Figure 19:
FIG. 19 is a diagram illustrating a method for calculating a weight of the voting information in accordance with the user reliability.

For example, a case as illustrated in FIG. 19 is described where the user reliability of the user A is 0.649, the user reliability of the user B is 0.889, the user reliability of the user C is 0.0, and the user reliability of the user D is 0.333. In this case, when the predetermined threshold is 0.5, the evaluation unit 26 calculates the reliability of the evaluation information based on the voting information of the user A and the user B whose user reliability is equal to or greater than 0.5.

In the example illustrated in FIG. 19, the voting information of the user A is "good" and the voting information of the user B is "bad", whereby the weight $c_j$ of the voting information is calculated by the following Formula (8).

[Math. 6]

$$c_j = (1+0)/2 = 0.5 \quad (8)$$

Then, the evaluation unit 26 calculates the reliability $r_j$ of the evaluation information with the following Formula (9). Note that $C_j = 1$ holds when the total number of users N is 0.

[Math. 7]

$$r_j^0 = 0.972, t = 10, \text{ when } \lambda = 0.001, \quad (9)$$

$$r_j = 0.972 \times 0.5 \times \exp(-0.01)$$
$$= 0.972 \times 0.5 \times 0.990049 \ldots$$
$$\approx 0.4811 \ldots$$

The evaluation unit 26 updates the constant by $r_j^0 \leftarrow r_j^0 \times c_j$ after the reliability of the evaluation information has been calculated. Then, the voting information is checked.

The reliability of the evaluation information of the present embodiment is an example of an evaluation information index representing an index that is provided to the evaluation information when the evaluation information is generated. The reliability of the evaluation information decreases as the elapsed time from the generation of the evaluation information increases, and is determined in accordance with the voting information representing whether or not the evaluation information is appropriate.

Figure 20:
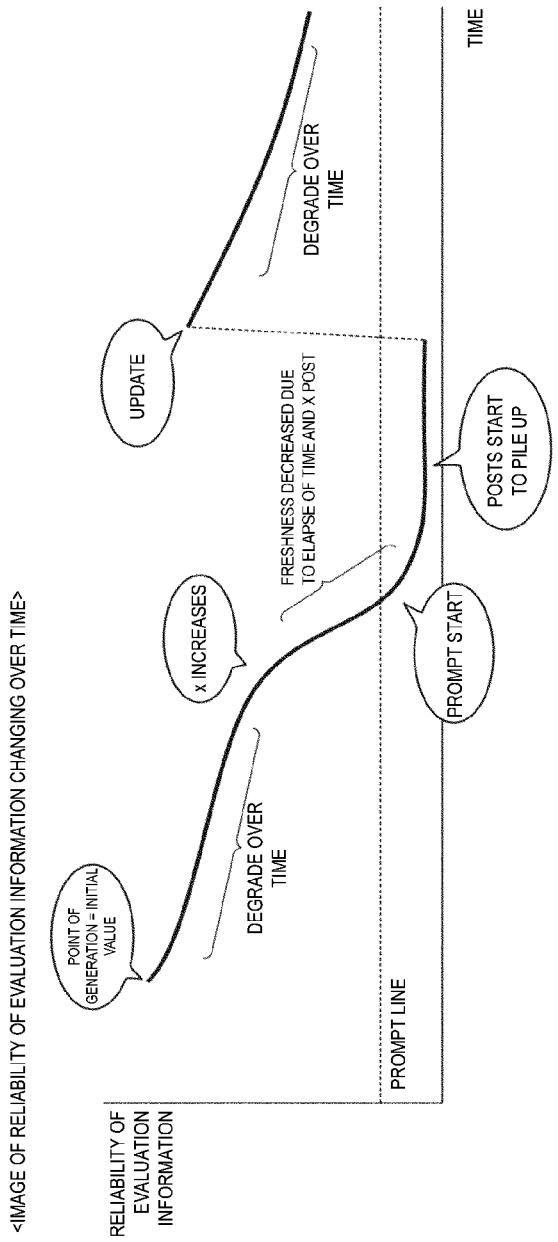
FIG. 20 is a diagram illustrating reliability of the evaluation information.

The reliability of the evaluation information of the present embodiment provided to the evaluation information when the evaluation information is generated. As illustrated in FIG. 20, the reliability of the evaluation information decreases as the time elapsed from the generation of the evaluation information increases. Additionally, the reliability of the evaluation information according to the present embodiment decreases with the voting information indicating whether the evaluation information is appropriate. For example, the reliability of the evaluation information is reduced in response to a vote (e.g., bad) indicating that the voting information from the plurality of users is inappropriate.

Thus, in the present embodiment, the request unit 28 issues a request for posting the post information is issued to a plurality of user when the reliability of the evaluation information drops equal to or below the threshold for the reliability of the evaluation information (upon reaching a "request line" illustrated in FIG. 20).

The request unit 28 requests a plurality of users for posting the post information, when the reliability of the evaluation information drops equal to or below the threshold value for the reliability of the evaluation information. Specifically, the request unit 28 prompts the plurality of user terminals 12 for posting of the post information.

Each of the plurality of users operates his/her user terminal 12 and posts the post information indicating the post content for the evaluation target on the website 13 in response to the request from the evaluation device 14.

The evaluation device 14 collects the post information posted by the plurality of user terminals 12. Specifically, the communication unit 16 of the evaluation device 14 receives post information posted by the plurality of user terminals 12.

The data acquisition unit 18 stores the post information received by the communication unit 16 in the data storage unit 20.

Then, the evaluation unit 26 again generates evaluation information for the evaluation target based on new post information different from the post information indicating the post content related to the evaluation target used for generating the previous evaluation information. Specifically, the evaluation unit 26 generates the evaluation information for the evaluation target again using the new evaluation information stored in the data storage unit 20.

Note that each table stored in the data storage unit 20 includes an item "check" as illustrated in FIG. 17 described above. Thus, the evaluation unit 26 generates the evaluation information again using the unchecked post information. Note that when the unchecked post information is used, post information within D days from the current time point, or P pieces of the latest post information are extracted, and one of these with a larger number of posts is used as the post information. Note that D and P are designable.

Note that post information not adopted as the evaluation information remains unchecked. Thus, the evaluation unit 26 may again generate the evaluation information for the evaluation target only based on post information newly posted in response to the posting prompt, not on unchecked post information.

Operation in Evaluation System 10

Figure 21:
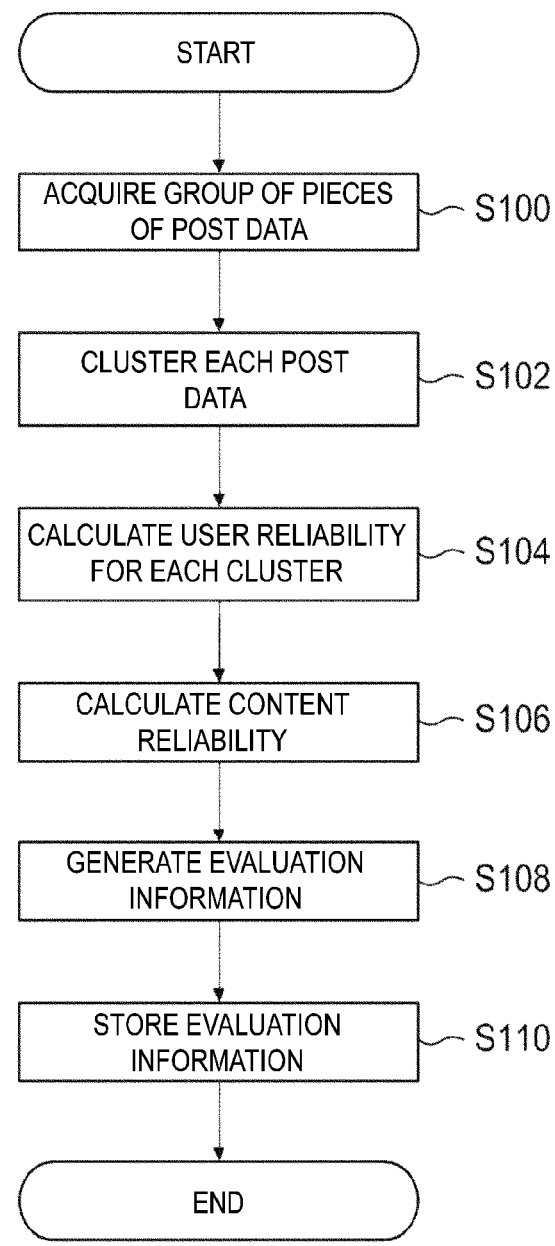
FIG. 21 is a diagram illustrating an example of an evaluation processing routine according to the present embodiment.

Next, operations of the evaluation system 10 according to the present embodiment will be described. First of all, when posting on the website 13 is performed from the plurality of user terminals 12 of the evaluation system 10, the data acquisition unit 18 acquires each post data via the communication unit 16. Then, the data acquisition unit 18 stores each acquired post data in the data storage unit 20. Then, upon receiving an evaluation information generation instruction signal, the evaluation device 14 executes an evaluation processing routine illustrated in FIG. 21. The evaluation processing routine illustrated in FIG. 21 is executed each time the evaluation information generation instruction signal is received.

Evaluation Processing Routine

In step S100, the clustering unit 22 acquires a group of pieces of post data stored in the data storage unit 20.

In step S102, the clustering unit 22 clusters the plurality of post data into a plurality of clusters based on at least one of the position information and the post information of post data in the group of pieces of post data obtained in step S100 described above.

In step S104, the acquisition unit 24 calculates, for each cluster as a result of the clustering in step S102, an average of user reliabilities of the plurality of pieces of post data belonging to the cluster. Then, the acquisition unit 24 acquires a cluster whose average of user reliabilities is equal to or higher than a threshold related to the user reliability.

In step S106, the evaluation unit 26 calculates the content reliability based on the post data of the cluster acquired in step S104 described above.

In step S108, the evaluation unit 26 generates as the evaluation information, post information in the post data, with the content reliability of the post information calculated in step S106 to be equal to or greater than the threshold related to the content reliability, from the post data of the cluster acquired in step S104 described above.

In step S110, the evaluation unit 26 stores the evaluation information generated in step S108 described above in the data storage unit 20, and terminates the evaluation processing routine.

Evaluation Update Processing Routine

After the evaluation information has been generated, voting is performed for the evaluation information by a plurality of users. Then, the evaluation device 14 executes the evaluation update processing routine illustrated in FIG. 22 at a predetermined timing.

In step S200, the evaluation unit 26 calculates the reliability of the evaluation information based on the voting information of the user whose user reliability is equal to or larger than a predetermined threshold.

In step S201, the request unit 28 determines whether the reliability of the evaluation information calculated in step S200 equal to or less than the threshold value related to the reliability of the evaluation information. If the reliability of the evaluation information is equal to or less than the threshold value related to the reliability of the evaluation information, the routine proceeds to step S202. On the other hand, when the reliability of the evaluation information is greater than a threshold value related to the reliability of the evaluation information, the evaluation update processing routine is terminated.

In step S202, the request unit 28 requests a plurality of user for posting the post information.

In step S204, the communication unit 16 receives the post information posted from the plurality of user terminals 12. The data acquisition unit 18 stores the post information received by the communication unit 16 in the data storage unit 20.

In step S206, the evaluation unit 26 generates again the evaluation information for the evaluation target based on new post information that is stored in the data storage unit 20 in step S204 described above and is different from the post information used for generating the previous evaluation information, and the evaluation update processing routine is terminated.

Figure 22:
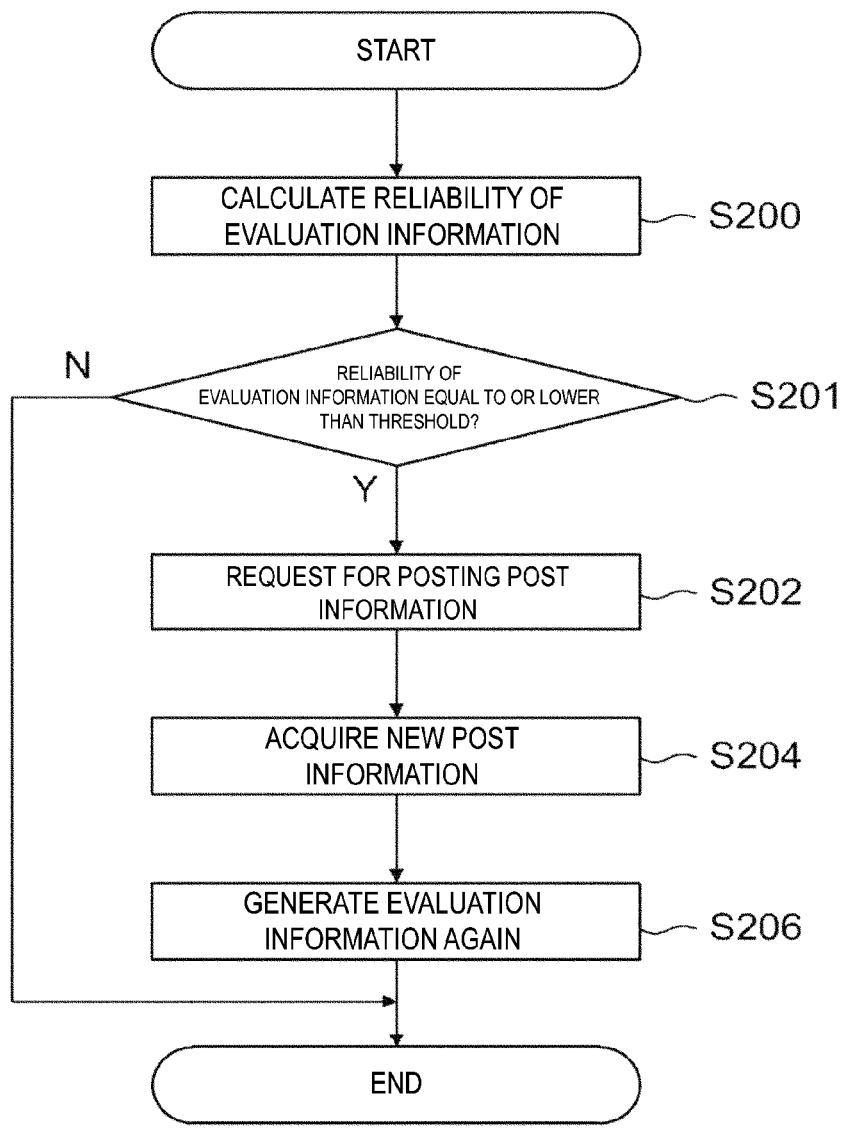
FIG. 22 is a diagram illustrating an example of an evaluation update processing routine according to the present embodiment.

The evaluation device 14 repeatedly executes the above-described evaluation processing routine illustrated in FIG. 21 and the above-described evaluation update processing routine illustrated in FIG. 22.

As described above, with the evaluation device according to the present embodiment, the user reliability is based on a group of pieces of post data including a plurality of pieces of post data including post information and poster information indicating the user who has posted the post information, and increases with the number of post information pieces posted in the past by the user, and with the number of post information posted by the user and adopted as the evaluation information. The evaluation device 14 can appropriately evaluate the evaluation target based on posts from the users related to the evaluation target, with the evaluation unit 26, based on the user reliability, acquiring the post data and evaluating whether the evaluation target exists based on the post data acquired.

The post information from general users is used so that the evaluation information covering a wide range can be generated and updated at a low cost, without using information from special investigators.

Appropriate evaluation information can be automatically extracted through statistical processing, without the need for a predetermined administrator checking the post content each time.

Furthermore, the present embodiment may be implemented in a form of a smartphone application to the user terminal 12 and the like, so that posts from wide variety of users can be easily gathered. In this case, the cost of distributing the application is much lower than gathering investigators. Furthermore, the user can post the information using his or her smartphone, and thus does not need to use any dedicated measurement devices.

Second Embodiment

Next, a second embodiment will be described. The configuration of the evaluation system according to the second embodiment is similar to that of the first embodiment, and thus description is omitted with the identical reference numerals provided.

In the second embodiment, instead of the reliability of the evaluation information, an acquisition level of the evaluation information generated based on the number of pieces of evaluation information in a predetermined region is used.

When a wide variety of pieces of evaluation information are efficiently collected based on the post information from general users, the amount of post information acquired is expected increase with time. Still, to shorten the time period for collecting the evaluation information, a location for which the information is required needs to be appropriately presented.

In view of this, in the second embodiment, the acquisition level is defined for detecting a location with no evaluation information or a location with the reliability of the evaluation information compromised.

Specifically, a rectangular area is set in advance in accordance with latitude and longitude, as the predetermined region. Then, the evaluation unit 26 according to the second embodiment calculates the number of pieces of evaluation information with position information corresponding to location within an area A (i=1, 2, . . . , M), as well as the average of the reliabilities of the evaluation information using the following Formula (10).
[Math. 8]

$$H(A_i) = e_{num}(A_i) \times e_{avg}(A_i)$$

$$e_{num}(A_i) = N(A_i)/M(A_i) \quad (10)$$

Note that $N(A_i)$ represents the number of pieces of evaluation information, and $M(A_i)$ represents the number of pieces of post information. Then, the evaluation unit 26 calculates the acquisition level using the following Formula (11) based on the value calculated by the above Formula (10).

[Math. 9]

$$e_{avg}(A_i) = \sum_{j=1}^{N(A_i)} r_j/N(A_i) \quad (11)$$

Note that $r_j$ represents the reliability of evaluation information j in the area $A_i$.

FIG. 23 illustrates a specific example of the acquisition level. In FIG. 23, $N(A_i)$, $M(A_i)$, $e_{num}(A_i)$, $e_{avg}(A_i)$, and $H(A_i)$. In this case, contents of the prompt for posting may be changed depending on which of the items illustrated in FIG. 23 is close to 0.

For example, an example case is considered where the threshold related to the prompt line is set to be 0.3. In this case, the request unit 28 prompts for new posting for the area $A_2$ with no evaluation information at all, and prompts for posting related to a change that has occurred in an area $A_4$, because the reliability of the evaluation information of this location is compromised.

Note that other configurations and operations of the evaluation device according to the second embodiment are the identical as those in the first embodiment, and thus descriptions thereof will be omitted.

As described above, in accordance with the evaluation device according to the second embodiment, an appropriate prompt for posting related to the evaluation target can be issued based on the acquisition level of the evaluation information generated based on the number of pieces of evaluation information within a predetermined region.

Furthermore, by using the acquisition level, a user as a poster can be notified of an area where the evaluation information is scarce or old. Thus, the user as the poster can recognize an area for which he or she should post information. Moreover, an administrator of the evaluation device 14 can efficiently obtain evaluation information of the area for which the evaluation information should be acquired.

The present invention is not limited to the above-described embodiment, and various modifications and applications can be made without departing from the gist of the present disclosure.

For example, the description on the above embodiment is given for an example of a case where the evaluation device 14 executes the evaluation processing in which the evaluation information is generated from the post information and the evaluation update processing in which the evaluation information is updated with a request for posting issued to a plurality of users. However, this should not be construed in a limiting sense. For example, the evaluation processing and the evaluation update processing may be executed by separate devices. In this case, a system may be established by, for example, an evaluation device that executes the evaluation processing and an evaluation update device that executes the evaluation update processing.

The present invention can also be implemented with a program installed in a known computer using a medium or a communication line.

The device described above incorporates a computer system. This "computer system" includes a webpage providing environment (or displaying environment) when the WWW system is used.

The description of the embodiment in this specification of the present application is given under an assumption that a program is installed in advance. However, such a program can be provided while being stored in a computer-readable recording medium.

REFERENCE SIGNS LIST

10 Evaluation system
12 User terminal
13 Website
14 Evaluation device
16 Communication unit
18 Data acquisition unit
20 Data storage unit
22 Clustering unit
24 Acquisition unit
26 Evaluation unit
28 Request unit
30 Communication means

The invention claimed is:
1. An evaluation update device comprising a processor configured to execute a method comprising:
generating evaluation information of an evaluation target based on first posting data posted by a first user of a plurality of users, the first posting data describing a first evaluation result of the evaluation target, wherein the evaluation information represents an evaluation of the evaluation target, and the evaluation information includes a location of the evaluation target;

determining a value of an evaluation information index of the evaluation information, wherein
the value of the evaluation information index indicates a level of reliability of the evaluation information of the evaluation target,
the value of the evaluation information index is based at least on a number of postings within a predetermined distance from the location of the evaluation target with similar contents of the evaluation information,
the value of the evaluation information index decreases as time elapses from a point when the evaluation information was generated,
the value of the evaluation information index decreases according to a decrease of a coefficient value representing an average value of voting information of the evaluation information over time since the value of the evaluation information was generated,
the average value of the voting information indicates an average of results of voting by at least a second user of the plurality of users on the evaluation information of the evaluation target, and
the voting is in response to inquiring the plurality of users whether the evaluation information is appropriate; and updating, based on a predetermined threshold value of the evaluation information index, the evaluation information of the evaluation target by replacing content of the evaluation information with second posting data posted by the second user of the plurality of users, the second posting data describing a second evaluation result of the evaluation target, wherein the second posting data is distinct from the first posting data; and updating the value of the evaluation information index according to the updated evaluation information of the evaluation target.

2. The evaluation update device according to claim 1, the processor further configured to execute a method comprising:

requesting the second user of the plurality of users for posting of the second posting data when the evaluation information drops equal to or below the predetermined threshold value of the evaluation information index;

generating, based on a location of the evaluation target as indicated as a part of respective posting data, a cluster of posting data, wherein the cluster of posting data includes the first posting data and the second posting data, wherein the cluster of posting data is a part of a plurality of clustering according to hierarchical clustering; and selecting, based at least on a predetermined distance from the location of the evaluation target as indicated in the second posting data, the second posting data.

3. The evaluation update device according to claim 2, wherein the evaluation information index indicates a reliability of the evaluation information generated based at least on the voting information indicating whether the evaluation information is appropriate, and the evaluation information is higher in the reliability when a result of voting by the second user indicates the evaluation information is appropriate.

4. The evaluation update device according to claim 2, wherein the evaluation information index includes an acquisition level of the evaluation information, the acquisition level being generated based on number of pieces of the evaluation information in a predetermined region, and the predetermined region includes the location of the evaluation target.

5. The evaluation update device according to claim 1, wherein the evaluation information index indicates a reliability of the evaluation information generated based at least on the voting information indicating whether the evaluation information is appropriate, and the evaluation information is higher in the reliability when a result of voting by the second user indicates the evaluation information is appropriate.

6. The evaluation update device according to claim 1, wherein the evaluation information index indicates an acquisition level of the evaluation information, the acquisition level being generated based on number of pieces of the evaluation information in a predetermined region, and the predetermined region includes the location of the evaluation target.

7. The evaluation update device according to claim 1 wherein the evaluation target includes at least one of:
a status of a location,
a road congestion status of an area,
a reputation of a restaurant, or
a reputation of food, and
wherein the evaluation information includes:
a review posting, and
a user of the plurality of users who posted posting data of the evaluation information.

8. An evaluation update method comprising:
generating evaluation information of an evaluation target based on first posting data posted by a first user of a plurality of users, the first posting data describing a first evaluation result of the evaluation target,
wherein the evaluation information represents an evaluation of the evaluation target, and the evaluation information includes a location of the evaluation target;

determining a value of an evaluation information index of the evaluation target, wherein
the value of the evaluation information index indicates a level of reliability of the evaluation information of the evaluation target,
the value of the evaluation information index is based at least on a number of postings within a predetermined distance from the location of the evaluation target with similar contents of the evaluation information,
the value of the evaluation information index decreases exponentially as time elapses from a point when the evaluation information was generated,
the value of the evaluation information index decreases according to a decrease of a coefficient representing an average value of voting information of the evaluation information over time since the value of the evaluation information was generated,
the average value of the voting information indicates an average of results of voting by at least a second user of the plurality of users on the evaluation information of the evaluation target, and
the voting is in response to inquiring the plurality of users whether the evaluation information is appropriate; and when the value of the evaluation index becomes less than or equal to a predetermined threshold associated with the evaluation information index:
updating the evaluation information of the evaluation target by replacing content of the evaluation information with second posting data posted by the second user of the plurality of users, the second posting data describing a second evaluation result of the evaluation target, wherein the second posting data is distinct from the first posting data; and updating the value of the evaluation information index according to the updated evaluation information of the evaluation target.

9. The evaluation update method according to claim 8, the method further comprising:

requesting the second user of the plurality of users for posting of the second posting data when the evaluation information drops equal to or below the predetermined threshold value of the evaluation information index, generating, based on a location of the evaluation target as indicated as a part of respective posting data, a cluster of posting data, wherein the cluster of posting data includes the first posting data and the second posting data, wherein the cluster of posting data is a part of a plurality of clustering according to hierarchical clustering; and selecting, based at least on a predetermined distance from the location of the evaluation target as indicated in the second posting data, the second posting data.

10. The evaluation update method according to claim 9, wherein the evaluation information index indicates a reliability of the evaluation information generated based at least on the voting information indicating whether the evaluation information is appropriate, and the evaluation information is higher in the reliability when a result of voting by the second user indicates the evaluation information is appropriate.

11. The evaluation update method according to claim 9, wherein the evaluation information index indicates an acquisition level of the evaluation information, the acquisition level being generated based on number of pieces of the evaluation information in a predetermined region, and the predetermined region includes the location of the evaluation target.

12. The evaluation update method according to claim 8, wherein the evaluation information index includes a reliability of the evaluation information generated based at least on the voting information indicating whether the evaluation information is appropriate, and the evaluation information is higher in the reliability when a result of voting by the second user indicates the evaluation information is appropriate.

13. The evaluation update method according to claim 8, wherein the evaluation information index includes an acquisition level of the evaluation information, the acquisition level being generated based on number of pieces of the evaluation information in a predetermined region, and the predetermined region includes the location of the evaluation target.

14. The evaluation update method according to claim 8, wherein the evaluation target includes at least one of:
a status of a location,
a road congestion status of an area,
a reputation of a restaurant, or
a reputation of food, and
wherein the evaluation information includes:
a review posting, and
a user of the plurality of users who posted posting data of the evaluation information.

15. A system for evaluating, the system comprises:
a processor; and
a memory storing computer-executable program instructions that when executed by the processor causes the system to:

generate evaluation information of an evaluation target based on first posting data posted by a first user of a plurality of users, the first posting data describing a first evaluation result of the evaluation target,
wherein the evaluation information represents an evaluation on the evaluation target, and the evaluation information includes a location of the evaluation target;

determine a value of an evaluation information index of the evaluation target, wherein
the value of the evaluation information index indicates a level of reliability of the evaluation information of the evaluation target,
the value of the evaluation information index is based at least on a number of postings within a predetermined distance from the location of the evaluation target with similar contents of the evaluation information,
the value of the evaluation information index decreases exponentially as time elapses from a point when the evaluation information was generated,
the value of the evaluation information index decreases according to a decrease of a coefficient value representing an average value of voting information of the evaluation information over time,
the average value of the voting information indicates an average of results of voting by at least a second user of the plurality of users on the evaluation information of the evaluation target, and
the voting is in response to inquiring the plurality of users whether the evaluation information is appropriate; and when the value of the evaluation information index becomes less than or equal to a predetermined threshold associated with the evaluation information index:
updating the evaluation information of the evaluation target by replacing content of the evaluation information with second posting data posted by the second user of the plurality of users, the second posting data describing a second evaluation result of the evaluation target, wherein the second posting data is distinct from the first posting data; and
updating the evaluation information index based on the updated evaluation information.

16. The system according to claim 15, the computer-executable instructions when executed further causing the system to:
request the second user of the plurality of users for posting of posting data when the evaluation information drops equal to or below the predetermined threshold value of the evaluation information index,
generating, based on a location of the evaluation target as indicated as a part of respective posting data, a cluster of posting data, wherein the cluster of posting data includes the first posting data and the second posting data, wherein the cluster of posting data is a part of a plurality of clustering according to hierarchical clustering; and
selecting, based at least on a predetermined distance from the location of the evaluation target as indicated in the second posting data, the second posting data.

17. The system according to claim 16, wherein the evaluation information index indicates a reliability of the evaluation information generated based on the voting information indicating whether the evaluation information is appropriate, and the evaluation information is higher in the reliability when a result of voting by the second user indicates the evaluation information is appropriate.

18. The system according to claim 15, wherein the evaluation information index indicates a reliability of the evaluation information generated based at least on the voting information indicating whether the evaluation information is appropriate, and the evaluation information is higher in the reliability when a result of voting by the second user indicates the evaluation information is appropriate.

19. The system according to claim 15, wherein the evaluation information index indicates an acquisition level of the evaluation information, the acquisition level being generated based on number of pieces of the evaluation information in a predetermined region, and the predetermined region includes the location of the evaluation target.

20. The system according to The system according to claim 15, wherein the evaluation target includes at least one of:
- a status of a location,
- a road congestion status of an area,
- a reputation of a restaurant, or
- a reputation of food, and wherein the evaluation information includes:
- a review posting, and
- a user of the plurality of users who posted posting data of the evaluation information.

\* \* \* \* \*